(12) United States Patent
Gattani et al.

(10) Patent No.: US 11,676,010 B2
(45) Date of Patent: *Jun. 13, 2023

(54) MEMORY SUB-SYSTEM WITH A BUS TO TRANSMIT DATA FOR A MACHINE LEARNING OPERATION AND ANOTHER BUS TO TRANSMIT HOST DATA

(71) Applicant: Micron Technology, Inc., Boise, ID (US)

(72) Inventors: Amit Gattani, Granite Bay, CA (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 727 days.

This patent is subject to a terminal disclaimer.

(21) Appl. No.: 16/601,392

(22) Filed: Oct. 14, 2019

(65) Prior Publication Data

US 2021/0110252 A1   Apr. 15, 2021

(51) Int. Cl.
| | |
|---|---|
| G05B 13/02 | (2006.01) |
| G06F 1/00 | (2006.01) |
| G06F 7/00 | (2006.01) |
| G06N 3/08 | (2023.01) |
| G06F 13/16 | (2006.01) |

(52) U.S. Cl.
CPC ........... *G06N 3/08* (2013.01); *G06F 13/1668* (2013.01)

(58) Field of Classification Search
CPC .................................................. G06F 13/1668
See application file for complete search history.

(56) References Cited

U.S. PATENT DOCUMENTS

| | | | |
|---|---|---|---|
| 8,131,659 | B2 | 3/2012 | Xu et al. |
| 9,965,208 | B1 | 5/2018 | Roohparvar et al. |
| 10,461,076 | B1 | 10/2019 | Brewer |
| 2010/0076915 | A1 | 3/2010 | Xu et al. |
| 2012/0246401 | A1 | 9/2012 | Agam et al. |
| 2016/0300156 | A1 | 10/2016 | Bowers et al. |
| 2017/0316829 | A1 | 11/2017 | Ehrman et al. |
| 2018/0293691 | A1* | 10/2018 | Nurvitadhi ............. G06N 3/084 |
| 2019/0057302 | A1 | 2/2019 | Cho et al. |
| 2020/0110547 | A1* | 4/2020 | Lee ....................... G06F 3/0619 |
| 2020/0151541 | A1 | 5/2020 | Meng et al. |
| 2020/0264790 | A1 | 8/2020 | Chang et al. |
| 2021/0089390 | A1 | 3/2021 | Lee et al. |

* cited by examiner

*Primary Examiner* — Samir W Rizk
(74) *Attorney, Agent, or Firm* — Lowenstein Sandler LLP

(57) ABSTRACT

A system includes a memory component to store host data from a host system and to store a machine learning model and input data. A controller includes an in-memory logic to perform a machine learning operation by applying the machine learning model to the input data to generate an output data. A bus can receive additional host data from the host system and provide the additional host data to the memory component. An additional bus can receive machine learning data from the host system and provide the machine learning data to the in-memory logic that is to perform the machine learning operation.

20 Claims, 18 Drawing Sheets

MEMORY SUB-SYSTEM WITH A BUS TO TRANSMIT DATA FOR A MACHINE LEARNING OPERATION AND ANOTHER BUS TO TRANSMIT HOST DATA

TECHNICAL FIELD

The present disclosure generally relates to a memory component, and more specifically, relates to a memory sub-system with a bus to transmit data for a machine learning operation and another bus to transmit host data.

BACKGROUND

A memory sub-system can be a storage device, a memory module, and a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
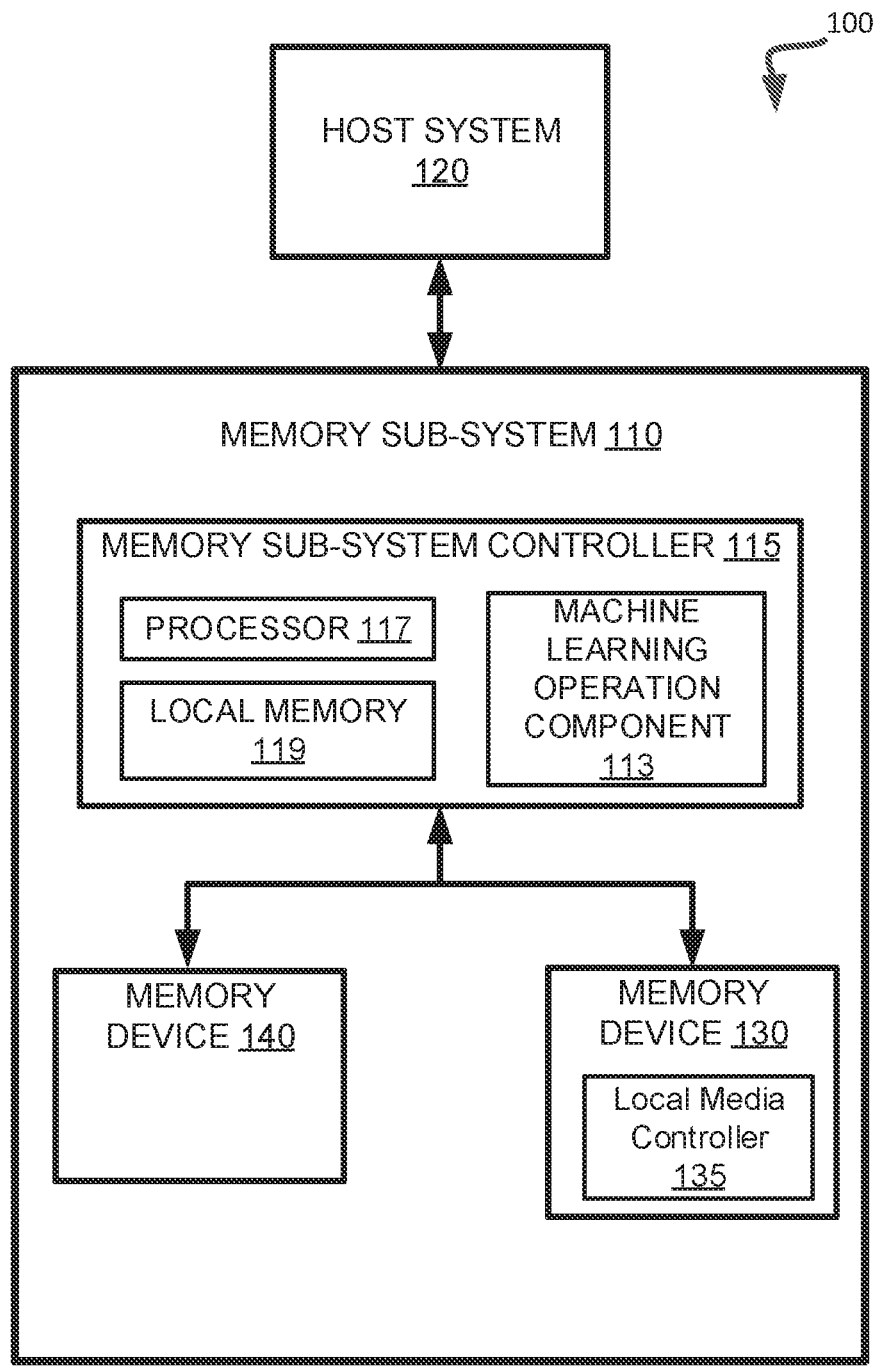
FIG. 1 illustrates an example computing environment that includes a memory sub-system in accordance with some embodiments of the present disclosure.

Aspects of the present disclosure are directed to a memory sub-system with a bus to transmit data for a machine learning operation and another bus to transmit host data. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components. The host system can provide data to be stored at the memory sub-system and can request data to be retrieved from the memory sub-system.

A conventional memory sub-system can utilize a conventional memory component to store and retrieve data for the host system. The host system can perform a machine learning operation that utilizes a machine learning model to process data. For example, the machine learning model can be used to classify the data or make other inferences or decisions based on the processing of the data with the machine learning model. A machine learning model refers to a model artifact that is created by a training process and can be composed of a single level of linear or non-linear operations (e.g., a support vector machine [SVM]) or multiple levels of non-linear operations such as a neural network (e.g., a deep neural network, a spiking neural network, a recurrent neural network, etc.). As an example, a deep neural network model can have one or more hidden layers, and can be trained by adjusting weights of a neural network in accordance with a backpropagation learning algorithm or the like.

Conventionally, the memory sub-system can store the data (e.g., input data to be applied to the machine learning model) that is to be processed as well as the machine learning model. The host system can further utilize a machine learning processor (e.g., a neural network processor or neural network accelerator) that is to perform the machine learning operation based on the data and the machine learning model that are stored at the memory components of the memory sub-system. For example, the data and the machine learning model can be retrieved from a memory component and provided to the machine learning processor. For certain machine learning operations, there can be a repeated transmission of intermediate data of the machine learning operation (e.g., intermediate data produced by different layers of the machine learning model) between the machine learning processor and the memory component of the memory sub-system. For example, during the performance of the machine learning operation, data can be transmitted via an external bus or interface between the memory component and the machine learning processor. The transmitting of the data, the machine learning model, any intermediate data, and the output data between the memory component (and/or memory sub-system) and the separate machine learning processor can take additional time or latency to transmit the various data over a separate external bus or interface that couples the memory component or memory sub-system with the separate machine learning processor.

Aspects of the present disclosure address the above and other deficiencies by having a memory component with internal logic to perform a machine learning operation. For example, the functionality of a machine learning processor can be implemented within internal logic of the memory component so that a separate and external bus or interface is not used to transmit data, the machine learning model, and any intermediate data between the memory component and/or memory sub-system and an external machine learning processor. For example, the machine learning processor can be implemented with internal logic that is based on memory cells of the memory component or the machine learning processor can be implemented with internal logic based on a digital logic or resistor array that is implemented inside of the memory component. In some embodiments, the machine learning processor can be implemented within the memory sub-system. For example, the machine learning processor can be implemented inside of a memory component that is included in the memory sub-system and/or the machine learning processor can be implemented inside of a controller of the memory sub-system (also referred to as the memory sub-system controller) or as a separate component (e.g., a separate machine learning processor circuit) of the memory sub-system.

As such, a memory component (or the memory sub-system) can be used to perform machine learning operations without the use of an external machine learning processor. Furthermore, the same memory component or memory sub-system can also be used to store and retrieve data for a host system. Thus, the host system can utilize the same memory component or memory sub-system to store and retrieve host data while also performing a machine learning operation for the host system.

Advantages of the present disclosure include, but are not limited to, the improved performance of a machine learning operation. For example, since no or less information (e.g., input data, intermediate data of the machine learning operation, or the machine learning model) is transmitted from the memory component or memory sub-system via an external bus or interface to an external machine learning processor, the latency to provide such information to be used in the machine learning operation can be decreased. As a result, the internal machine learning processor can receive input data and the machine learning model in less time while also storing and retrieving the intermediate data and output results of the machine learning operation in less time. Thus, the performance of the memory component or memory sub-system to perform the machine learning operation can be improved as less time is used to perform a single machine learning operation, thereby facilitating the memory component or memory sub-system to perform additional machine learning operations.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a negative-and (NAND) type flash memory. Each of the memory devices 130 can include one or more arrays of memory cells such as single level cells (SLCs) or multi-level cells (MLCs) (e.g., triple level cells (TLCs) or quad-level cells (QLCs)). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

Although non-volatile memory components such as NAND type flash memory are described, the memory device 130 can be based on any other type of non-volatile memory, such as read-only memory (ROM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. In the same or alternative embodiments, the local media controller 135 can include the machine learning operation component 113 to perform machine learning operations, and/or the machine learning operation component 113 can be implemented based on internal logic of the memory devices 130 and/or 140.

The memory sub-system 110 includes a machine learning operation component 113 that can perform machine learning operations. In some embodiments, the memory sub-system controller 115 includes at least a portion of the machine learning operation component 113. For example, the memory sub-system controller 115 can include a processor 117 (processing device) configured to execute instructions stored in local memory 119 for performing the operations described herein. In some embodiments, the machine learning operation component 113 is part of the host system 110, an application, or an operating system.

The machine learning operation component 113 can be used to perform machine learning operations. For example, the machine learning operation component 113 can receive data from a memory component and can also receive a machine learning model from the memory component. The machine learning operation component 113 can perform a machine learning operation based on the received data and the received machine learning model to generate an output result. Further details with regards to the operations of the machine learning operation component 113 are described below.

Figure 2:
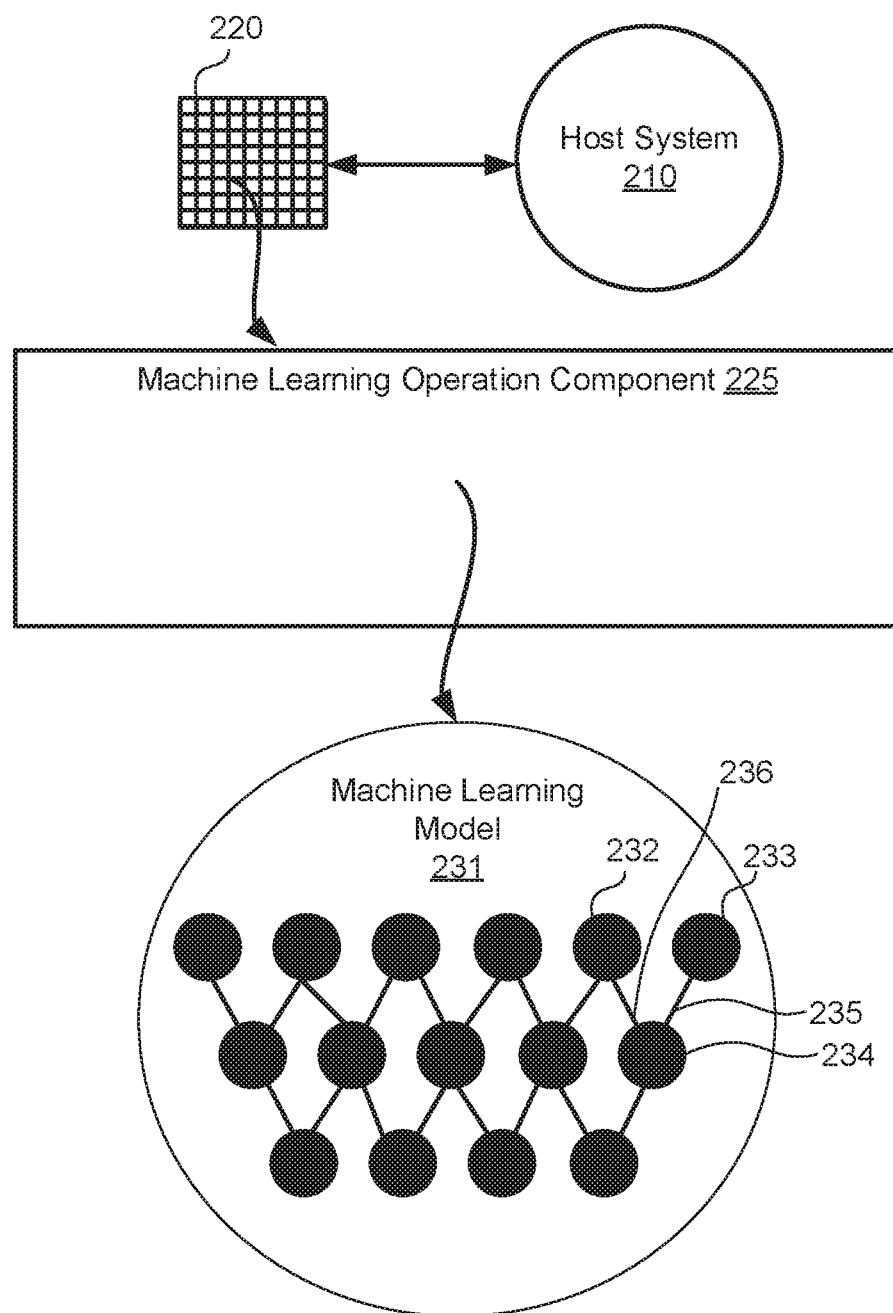
FIG. 2 illustrates an example computing environment that includes one or more memory components that include a machine learning operation component in accordance with some embodiments of the present disclosure.

FIG. 2 illustrates an example computing environment that includes one or more memory components that include a machine learning component 225 in accordance with some embodiments of the present disclosure. In general, the memory component 220 can correspond to the memory device 130 or the memory device 140 of FIG. 1. For example, the memory component 220 can be a volatile memory component or a non-volatile memory component.

As shown in FIG. 2, the memory component 220 can include a machine learning operation component 225 that can perform machine learning operations. In some embodiments, the machine learning operations can include, but are not limited to, the processing of data by using a machine learning model 231 to classify the data, make predictions or decisions, or any other type of output result. The machine learning model 231 can be based on, but is not limited to, neural networks such as spiking neural networks, deep neural networks, etc. or another type of machine learning model. As an example, the machine learning operation can correspond to the use of a machine learning model to process input image data to classify or identify an object or subject of the input image data. In some embodiments, the machine learning model can be a neural network that is represented by a group of nodes (i.e., neurons) that are connected with other nodes. The connection between a pair of nodes can be referred to as an edge. For example, a node 232 and another node 233 can be connected to a third node 234 with edges 235 and 236. Each edge in the neural network can be assigned a weight that is identified as a numerical number. Input data (e.g., the data to be processed) can be provided to a node and can then be processed based on a weight of a connecting edge. For example, a value of a weight of an edge can be multiplied with input data of the node and the node at the end of the edge can accumulate multiple values. As an example, the node 232 can receive an input data and the node 233 can receive another input data (e.g., pixel bit values associated with an image). The particular weight value assigned to the edge 236 can be combined (e.g., multiplied or other such operation) with the input data provided to the node 232 to generate an output value and another weight value assigned to the edge 235 can be combined (e.g., multiplied) with the other input data provided to the node 233 to generate another output value. The output values can then be combined (e.g., accumulated) at the node 234 to generate a combined output value. The combined output value from the node 234 can be combined or multiplied with another weight assigned to a next edge and accumulated at a next node. For example, the machine learning model 231 can include nodes grouped into multiple layers. Signals (e.g., input data and intermediate data) can propagate through the layers until a last layer (i.e. the final output layer) that generates the output results of the machine learning operation. As previously described, the input data and other such intermediate data from nodes are multiplied with weights of edges and then accumulated at other nodes at the end or destination of the edges. As such, the machine learning operation can include layers or a series of multiplication and accumulation (MAC) sub-operations.

As shown, the machine learning model 231 can be implemented in the internal logic of a memory component 220. For example, the machine learning model 231 can be implemented as digital logic or a resistor array of the memory component 220 as described in conjunction with FIG. 3. For example, the nodes, edges, and weights can be implemented in the digital logic or the resistor array of the memory component. In some embodiments, the machine learning model 231 can be implemented in the memory cells of the memory component 220 as described in conjunction with FIG. 5. For example, the nodes, edges, and weights can be implemented by using or configuring the memory cells of the memory component. In some embodiments, a memory sub-system controller of a memory sub-system can implement the machine learning model 231 as described in conjunction with FIG. 8. In the same or alternative embodiments, the machine learning model 231 can be implemented in one or more memory components 220 of a memory sub-system as described in conjunction with FIG. 9.

Figure 3:
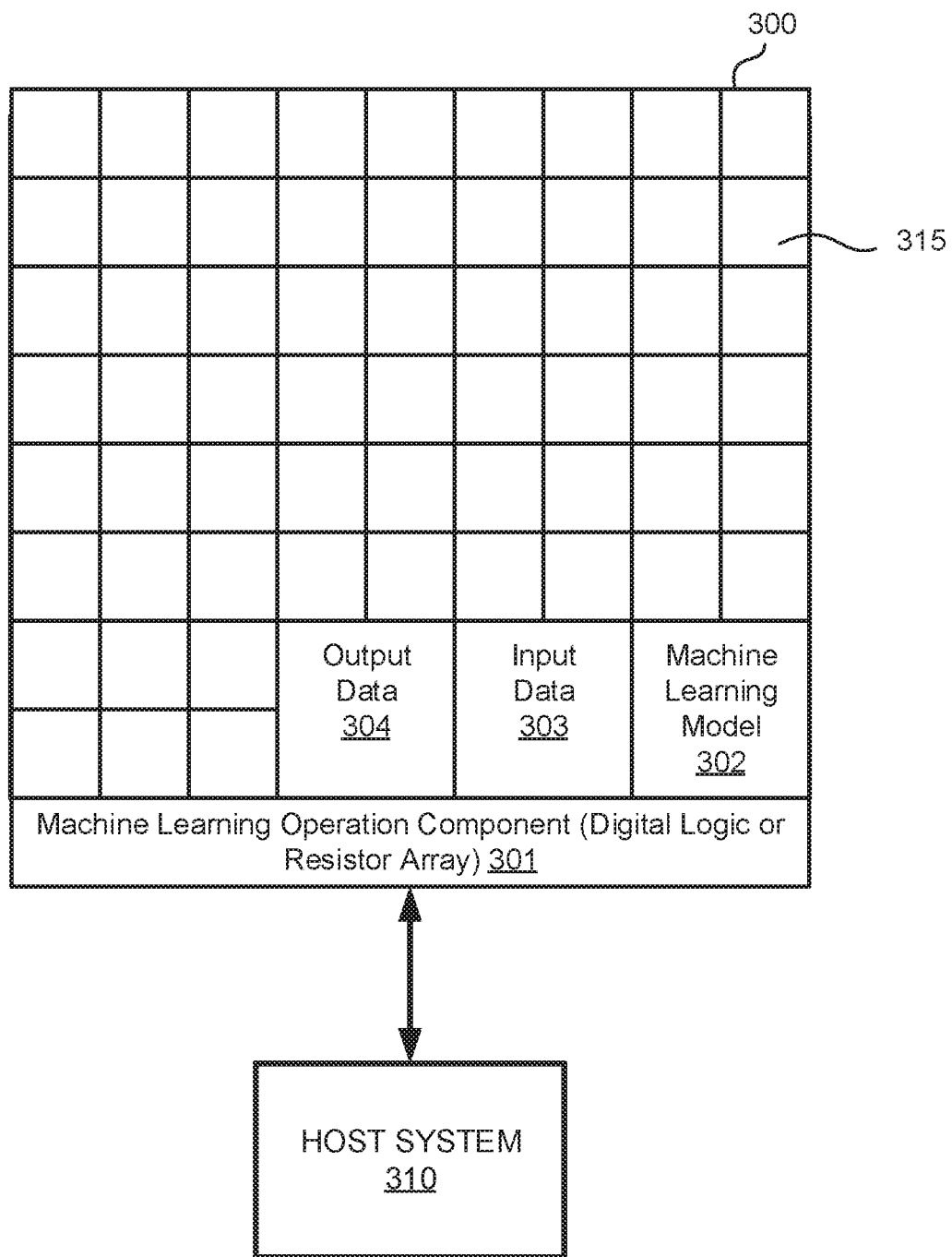
FIG. 3 illustrates an example memory component with an internal machine learning operation component in accordance with some embodiments of the present disclosure.

FIG. 3 illustrates an example memory component 300 with an internal machine learning component in accordance with some embodiments of the present disclosure. In general, the memory component 300 can correspond to the memory device 130 or 140 of FIG. 1 or the memory component 220 of FIG. 2. The memory component 300 can be either a volatile memory component or a non-volatile memory component.

As shown in FIG. 3, the memory component 300 can include memory cells 315 that are used to store data. For example, the memory component 300 can receive data from a host system 310 and can store the data at the memory cells 315 of the memory component 300. The host system can further specify machine learning operations that are to be performed by the memory component 300. For example, the machine learning operations can be performed by a machine learning operation component 301 that is included within the packaging of the memory component 300 or is internal to the memory component 300. In some embodiments, the machine learning operation component 301 can correspond to digital logic that is used to implement machine learning operations. For example, the digital logic can be used to implement a machine learning model and to receive input data for the machine learning model and to generate the output data for the machine learning model. As previously described, the machine learning model can be the structure and nodes of a neural network and associated weight values of edges between the nodes of the neural network. Machine learning operations as described in conjunction with FIG. 2 can then be performed by the digital logic of the machine learning operation component 301 that are configured based on the weights, edges, and nodes of the machine learning model. The digital logic can be implemented by using digital logic gates or other such circuitry. In some embodiments, the multiply and accumulate (MAC) sub-operations of the machine learning operation can be performed by the digital logic of the machine learning operation component 301.

In some embodiments, the machine learning operation component 301 can correspond to a resistor array. For example, the multiply and accumulate sub-operations of the machine learning operation can be performed by the resistor array of the machine learning operation component 301. For example, the resistor array can represent the machine learning model. Each resistor can represent a node and resistance values of the resistors can be programmed or tuned to correspond to a weight value of an edge between a pair of resistors that represents a pair of nodes of the neural network. For example, a resistor can represent a node and a resistance of the resistor can be programmed to represent the weight value for an edge that is connected at the output of the resistor. The output of a resistor can be an analog value that is based on the programmed resistance of the resistor and the analog input to the resistor (e.g. the multiplication sub-operation). The analog value outputs of a pair of resistors can then be combined to generate a combined analog value (e.g., the accumulate sub-operation). In some embodiments, the output of the last layer of resistors of the machine learning model can be coupled with an analog to digital (ADC) converter to convert one or more analog signals that are the last values of the machine learning model to a digital signal that can be used to represent the output of the machine learning model.

In operation, the memory component 300 can store input data 303 for the machine learning operation. For example, the input data 303 can be images, audio, text, or any other data. The input data 303 can be stored at a particular region of the memory cells of the memory component 300 that has been allocated to store input data for machine learning operations. The allocated region of the memory cells can store multiple different input data that can each be used during the machine learning operation. In some embodiments, the input data 303 can be provided by the host system 310. For example, the host system 310 can transmit the input data 303 to the memory component or a memory sub-system that includes the memory component. In the same or alternative embodiments, the host system 310 can provide an indication that a machine learning operation is to be performed on the input data 303. For example, the host system 310 can identify particular input data that is to be used for the machine learning operation. The machine learning model 302 can store information that specifies the structure (e.g., edges, nodes, and weight values) of one or more machine learning models. For example, another region of the memory cells of the memory component 300 can be allocated to store the machine learning model 302. In some embodiments, the other region can store different machine learning models.

In operation, the host system 310 can specify particular input data and a particular machine learning model that is to be used with a machine learning operation. The machine learning operation component 301 can receive the machine learning model 302 that corresponds to the specified machine learning model and can be configured or programmed to implement a machine learning operation based on the machine learning model 302. For example, multiply and accumulate sub-operations can be performed as per the machine learning model 302. In some embodiments, the digital logic or the resistance values of the resistor array can be configured to perform the multiply and accumulate sub-operations based on the machine learning model 302. The machine learning operation component 301 can then perform the machine learning operation by retrieving the specified input data 303 and processing the retrieved input data 303 based on the machine learning model 302 to generate the output data 304. For example, the output data can be stored at another region of the memory cells of the memory component 300 that are allocated to store the results of the machine learning operation component 301. In some embodiments, the output data 304 can be returned to the host system 310. In the same or alternative embodiments, the machine learning operation component 301 can provide an indication or notification to the host system 310 that the requested machine learning operation has been completed and that the resulting output data 304 has been stored at a particular location at the memory sub-system. The host system 310 can later request the resulting output data 304 by specifying the particular location at which the output data 304 has been stored.

In some embodiments, the machine learning model 302, input data 303, and output data 304 can be stored in the portion of the memory component that is proximate or closer to the machine learning operation component 301 than other memory cells of the memory component.

Accordingly, a memory component can be used to store data for a host system. The same memory component can include internal logic to perform machine learning operations for the host system. The internal logic can be coupled with the memory cells of the memory component via one or more internal buses that are not external to the memory component.

Figure 4:
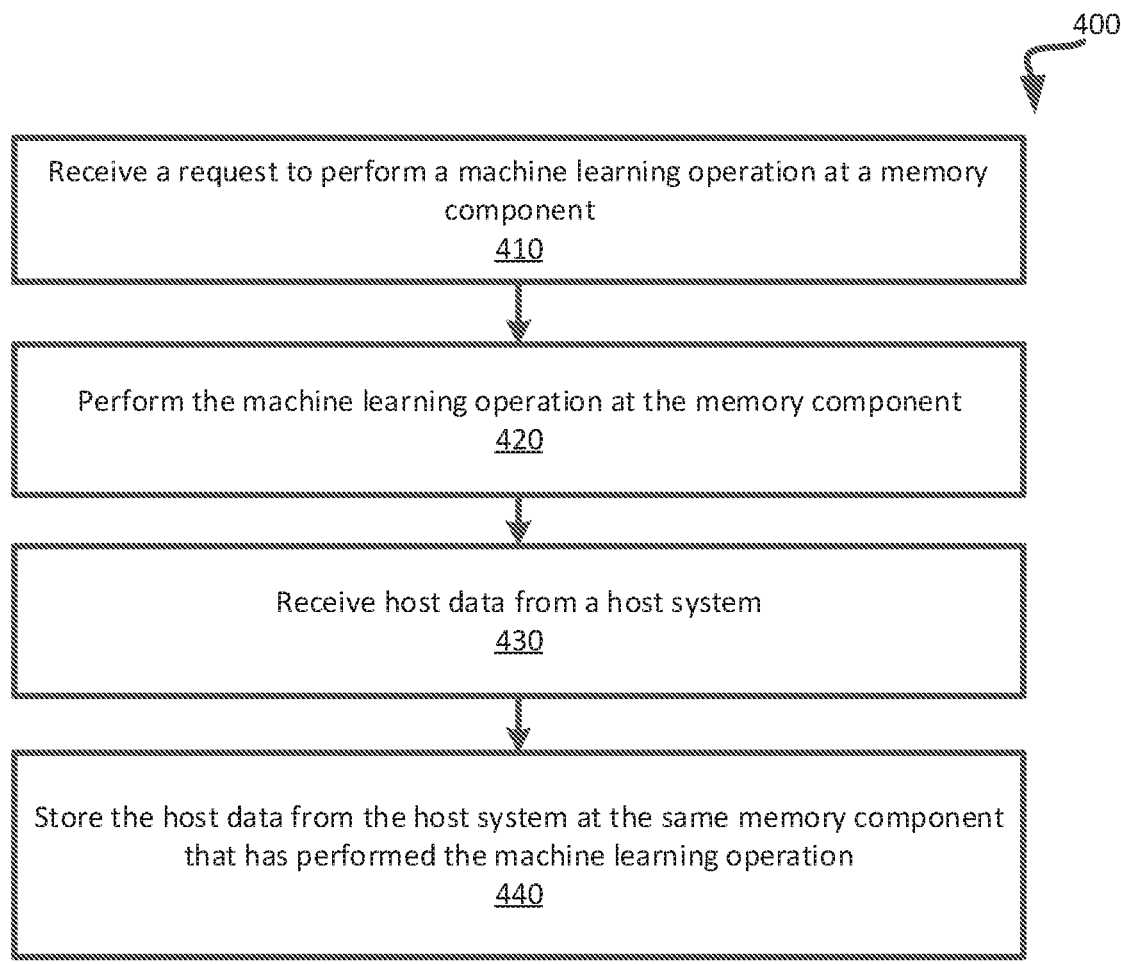
FIG. 4 is a flow diagram of an example method to perform a machine learning operation and to store host data at a memory component in accordance with some embodiments.

FIG. 4 is a flow diagram of an example method 400 to perform a machine learning operation and to store host data at a memory component in accordance with some embodiments. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the machine learning operation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 4, at operation 410, the processing logic receives a request to perform a machine learning operation at a memory component. The machine learning operation can be specified by a host system. For example, the host system can provide input data that is to be processed and analyzed by the machine learning operation to generate output data or the host data can specify input data that is currently stored at the memory component. In some embodiments, the machine learning operation can be performed by digital logic or a resistor array that is included within the memory component. For example, the machine learning operation can be performed by internal logic of the memory component. In the same or alternative embodiments, the machine learning operation can be performed by memory cells of the memory component as described in conjunction with FIG. 5. The machine learning operation can be a neural network processing of the input data as previously described. Furthermore, the host system can specify a particular machine learning model that is to be used during the machine learning operation.

At operation 420, the processing logic performs the machine learning operation at the memory component. For example, a machine learning operation can be performed by the internal logic of the memory component as previously described. In some embodiments, machine learning operation component can be configured to perform the machine learning operation based on the machine learning model. At operation 430, the processing logic receives host data from a host system. For example, the host system can provide data to be stored at the memory component or the memory sub-system that includes the memory component. The host data can be data that is not intended to be used by the machine learning operation. For example, the host data can be other data that is to written to the memory component and to be retrieved from the memory component in response to subsequent read operations from the host system. At operation 440, the processing logic stores the host data from the host system at the same memory component that has performed the machine learning operation. For example, the host data can be stored across memory cells of the memory component that also includes the internal logic to perform the machine learning operation. Furthermore, the internal logic can be separate from the memory cells of the memory component. As such, the same memory component can be used to store host data as well as to perform a machine learning operation for the host system.

Figure 5:
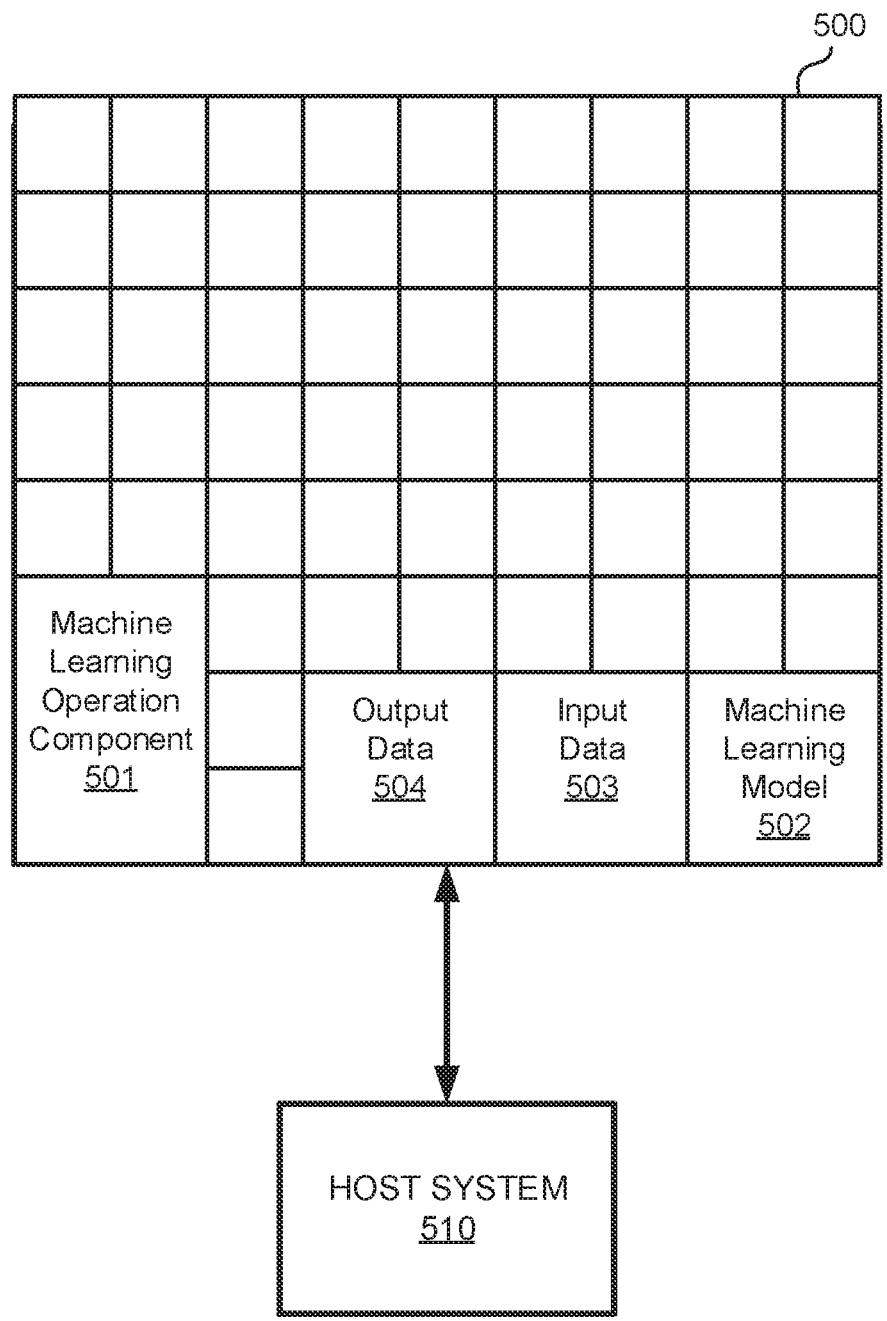
FIG. 5 illustrates an example memory component with an internal machine learning operation component based on memory cells of the memory component in accordance with some embodiments of the present disclosure.

FIG. 5 illustrates an example memory component 500 with an internal machine learning operation component based on memory cells of the memory component in accordance with some embodiments of the present disclosure. In general, the memory component 500 can correspond to the memory devices 130 or 140 of FIG. 1 or the memory component 220 of FIG. 2. The memory component 500 can be either a volatile memory or a non-volatile memory. Furthermore, the machine learning operation component 501 can correspond to the machine learning operation component 113 of FIG. 1.

As shown in FIG. 5, the machine learning operation component 501 can be based on the memory cells of the memory component 500. For example, the memory cells of the memory component 500 can be used to implement the machine learning model 502 of a machine learning operation. In some embodiments, the conductivity of different memory cells can be used to implement the machine learning model. For example, each memory cell can correspond to a node of a neural network and the conductivity of the memory cell can be programmed to correspond to a weight value that is to be applied to an input of the memory cell. For example, the memory cell can be programmed to a particular conductivity so that when an input is applied to the memory cell, the change (e.g., multiplication) to the input signal that is applied by the memory cell can be based on the conductivity of the memory cell. Furthermore, a memory cell can receive multiple input signals from outputs of other memory cells. Such input signals can be accumulated at the memory cell and subsequently multiplied based on the conductivity of the memory cell. As such, the multiply and accumulate sub-operations as previously described can be performed by configuring or programming the memory cells to represent the nodes, edges, and weight values of a machine learning model.

The input data 503 can be the data that is to be processed by the machine learning operation as previously described. For example, the input data 503 can be received from the host system 510 for the machine learning operation to analyze and can be stored at a region of the memory cells of the memory component 500. The machine learning operation can be performed with the input data 503 and output data 504 can be generated based on the input data 503 and a machine learning model 502 as previously described. For example, the machine learning operation component 501 can configure the memory cells that are used for the machine learning operation (e.g., the multiply and accumulate sub-operations) based on the machine learning model 502. The configuring of the memory cells can correspond to the programing of the conductivity of the memory cells based on the weight values specified by the machine learning model 502. The machine learning operation component 501 can then process the input data 503 to generate the output data 504 and store the output data 504 at another region of the memory cells of the memory component 500. In some embodiments, the output data 504 can be returned to the host system 510. In the same or alternative embodiments, the machine learning model 502, input data 503, and output data 504 can be stored at the memory cells that are proximate or closer to the machine learning operation component 501 than other memory cells of the memory component that are used to store host data that is not used by the machine learning operation.

As such, the memory cells of the same memory component can be used to store data from the host system 510 as well as to perform the machine learning operations for the host system 510. For example, a region of the memory cells can be used to store host data and to return host data in response to read requests from the host system 510. Another different region of the memory cells can be used to represent the nodes and weights of a neural network of a machine learning operation. In some embodiments, the regions of the memory cells can be coupled with an internal bus of the memory cells.

Figure 6:
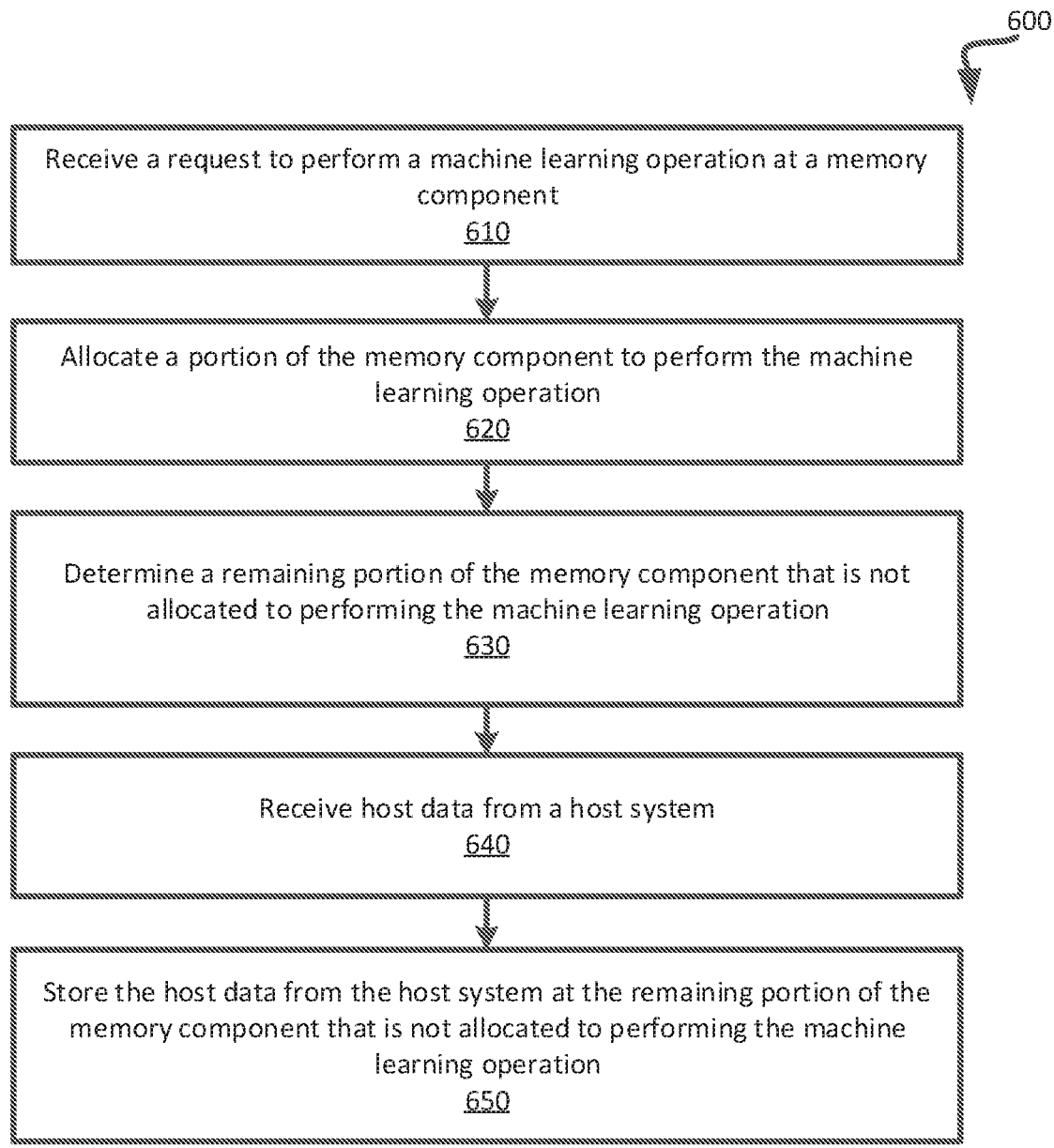
FIG. 6 is a flow diagram of an example method to allocate portions of a memory component to a machine learning operation and to store host data in accordance with some embodiments.

FIG. 6 is a flow diagram of an example method 600 to allocate portions of a memory component to a machine learning operation and to store host data in accordance with some embodiments. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the machine learning operation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 6, at operation 610, the processing logic receives a request to perform a machine learning operation at a memory component. For example, a host system can provide an indication that the memory component is to perform a machine learning operation. As previously described, the machine learning operation can be a neural network operation. The host system can store data at the memory component and indicate that the input to the machine learning operation is the data that has been stored at the memory component. For example, the host system can specify or identify particular data or a location of data that is stored at the memory component that should be the input to the machine learning operation. At operation 620, the processing logic allocates a portion of the memory component to the machine learning operation. For example, a region or portion of the memory cells of the memory component can be used to implement the machine learning operation based on a machine learning model. In some embodiments, the machine learning model can be received from the host system or can be received from another region of the memory component. As previously described, the allocation of the portion of the memory component can correspond to the programming of the memory cells to implement a machine learning model such as a neural network. At operation 630, the processing logic determines a remaining portion of the memory component that is not allocated to the machine learning operation. For example, another region or portion of the memory cells that are not used to implement the machine learning operation can be identified. For example, the remaining memory cells of the memory component that can be used to store host data can be determined. In some embodiments, a data structure can store information that identifies the region or memory cells (or data blocks or other such data units) of the memory component that are used to implement the machine learning operation and the other region or memory cells (or other data blocks or data units) can be used to store host data while the machine learning operation is implemented within the memory component. At operation 640, the processing logic receives host data from a host system. For example, the host system can provide data that is to be stored at the memory component. In some embodiments, the host data can be data that is not operated on by the machine learning operation. In the same or alternative embodiments, the host data can be a combination of data that is not operated on by the machine learning operation and other data that is to be an input to the machine learning operation. At operation 650, the processing logic stores the host data from the host system at the remaining portion of the memory component that is not allocated to the machine learning operation. For example, the host data can be stored at the memory component that is also performing the machine learning operation on other data. In some embodiments, the host system can specify whether particular data is to be an input for the machine learning operation or is not to be an input for the machine learning operation. If the data is to be an input for the machine learning operation, then the received data can be stored at a region or portion of the memory component that is to store input data for the machine learning operation. For example, as previously described with respect to FIG. 5, the data can be stored at a region of the memory component that has been allocated to store input data for the machine learning operation. Otherwise, if the data is not to be an input for the machine learning operation, then the data can be stored elsewhere at the memory component.

As such, a memory component can include internal logic that performs a machine learning operation. The internal logic can be implemented in the memory cells of the memory component. The same memory component can further store host data. The host data can include input data for the machine learning operation and other data that is not input data or used with the machine learning operation.

Figure 7:
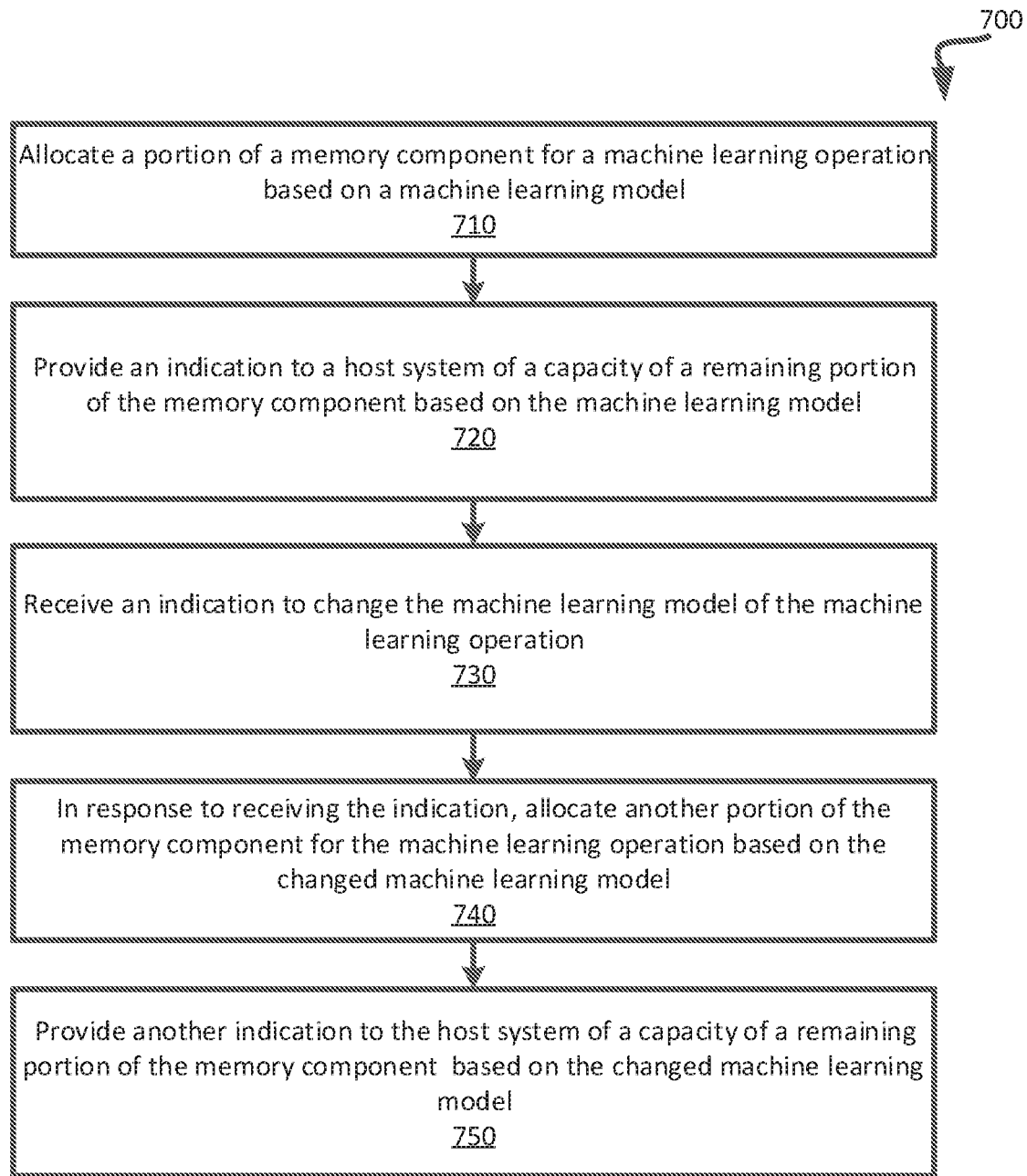
FIG. 7 is a flow diagram of an example method to provide an indication to a host system of a capacity of a memory component based on a machine learning model in accordance with some embodiments.

FIG. 7 is a flow diagram of an example method 700 to provide an indication to a host system of a capacity of a memory component based on a machine learning model in accordance with some embodiments. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the machine learning operation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 7, at operation 710, the processing logic allocates a portion of a memory component for a machine learning operation based on a machine learning model. For example, memory cells of the memory component can be configured or programmed based on node, edges, and weights that are specified by the machine learning model. As such, a portion of the memory cells of the memory component can be allocated to be programmed or configured for the machine learning operation. At operation 720, the processing logic provides an indication to a host system of a capacity of a remaining portion of the memory component based on the machine learning model. For example, the capacity of the memory component to store host data can be determined. The capacity to store the host data can be based on the difference between a capacity of the memory component when no machine learning operation is implemented in the memory component and a capacity of the memory component when the machine learning operation is implemented in the memory component. In some embodiments, the capacity can be determined based on a difference between an amount of data that can be stored at the total number of memory cells of the memory component when no machine learning operation is implemented at the memory cells and the amount of data that can be stored at the number of memory cells that are used to implement the machine learning operation. The indication can be provided by the memory component or a memory sub-system controller of a memory sub-system that includes the memory component. In some embodiments, the indication can specify a capacity of the memory component (or the memory sub-system) to store host data that is not be used by the machine learning operation, a capacity of the memory component to store input data for the machine learning operation, a capacity of the memory component to store output data of the machine learning operation, and a portion of the memory component that is used to implement the machine learning operation.

At operation 730, the processing logic receives an indication to change the machine learning model of the machine learning operation. In some embodiments, the host system can specify that a different machine learning model is to be used during the machine learning operation. For example, a new neural network or other such new machine learning model can be implemented. In some embodiments, the host can indicate that the new machine learning model is to be used when a different analysis or processing of the input data or a different type or classification of input data is to be used for the machine learning operation. A different number of memory cells can be programmed or configured based on the new machine learning model. For example, a portion of the memory cells of the memory component can be configured or programmed to perform a machine learning operation based on a machine learning model. The machine learning operation can then be based on a new machine learning model. Another portion of the memory cells of the memory component can then be configured to be programmed to perform the machine learning operation based on the new machine learning model.

In some embodiments, more memory cells or less memory cells can be configured or programmed to implement the machine learning operation with the new machine learning model as opposed to the prior machine learning model. In the same or alternative embodiments, the memory cells that are used to implement the machine learning operation with the new machine learning model can be different memory cells than the memory cells used to implement the machine learning operation with the prior machine learning model. For example, if more memory cells are to be used for the new machine learning model, then the memory cells used to configure the prior machine learning model and additional memory cells can be used to implement the machine learning operation with the new machine learning model. As such, the memory cells that are used to implement the machine learning operation with the new machine learning model can include the same or a subset of the memory cells that are used to implement the machine learning operation with the prior machine learning model. In some embodiments, the memory cells that are configured or programmed to implement the new machine learning model can be different than the memory cells that are used to implement the prior machine learning model. For example, a different group of memory cells can be used to implement the machine learning operation with the new machine learning model as opposed to the memory cells used for the prior machine learning model. In some embodiments, the different group of memory cells can be memory cells that were allocated to store host data. As such, the group of memory cells that are used to store host data and the group memory cells that are used to implement the machine learning model can change between the groups of memory cells so that the machine learning operation is not continuously implemented with the same group of memory cells.

At operation 740, the processing logic allocates another portion of the memory component for the machine learning operation based on the changed machine learning model in response to receiving the indication. For example, a different number of memory cells can be programmed or configured to implement the machine learning operation with the changed machine learning model. In some embodiments, the memory cells that implemented the prior machine learning model can be configured or programmed to no longer implement the prior machine learning model. For example, the memory cells that implemented the prior machine learning model can be configured or programmed to no longer implement the prior machine learning model and then the memory cells can be configured or programmed to implement the new machine learning model. As such, since a different number of memory cells can be used to implement the new machine learning model, the capacity of the memory component to store host data can also be changed. For example, if the new machine learning model specifies more nodes than the prior machine learning model, then more memory cells can be used to implement the new machine learning model. At operation 750, the processing logic provides another indication to the host system of a capacity of a remaining portion of the memory component based on the changed machine learning model. For example, the indication can specify a remaining capacity of the memory component that can be used to store host data while the internal logic of the memory component (e.g., other memory cells) are configured or programmed to implement the new machine learning model. The remaining capacity of the memory component can be different than the prior remaining capacity of the memory component when the prior machine learning model was implemented.

Figure 8:
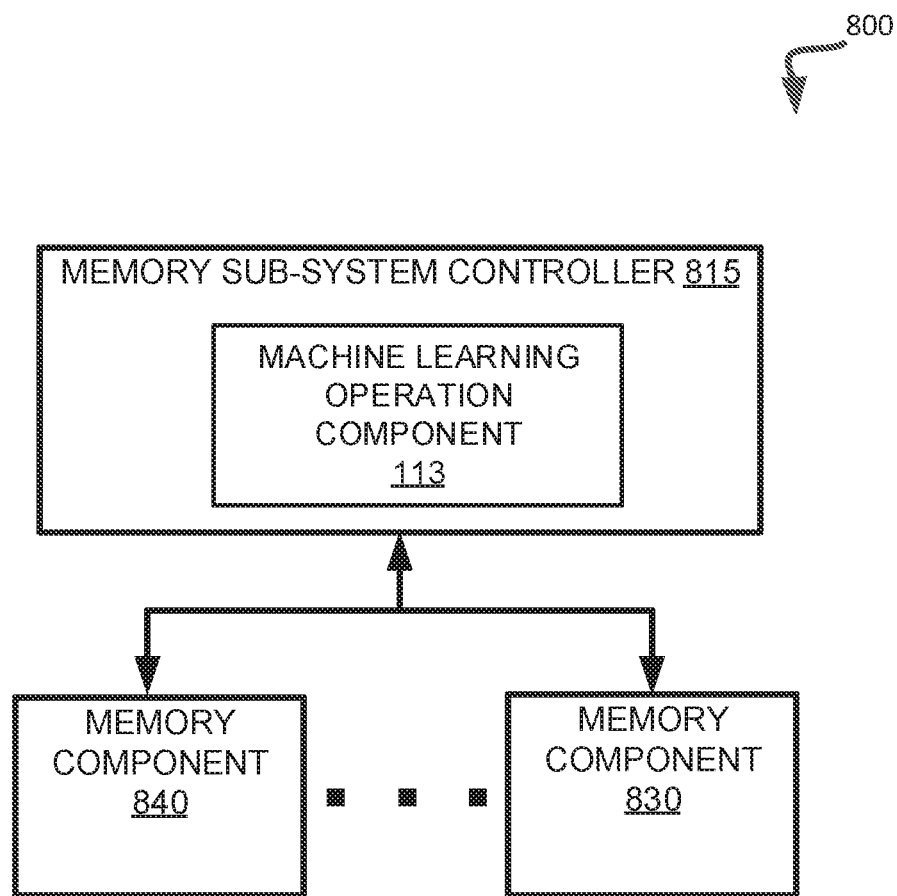
FIG. 8 illustrates a machine learning operation component implemented in a memory sub-system controller of a memory sub-system in accordance with some embodiments of the present disclosure.

FIG. 8 illustrates a machine learning operation component implemented in a memory sub-system controller of a memory sub-system 800 in accordance with some embodiments of the present disclosure.

As shown in FIG. 8, the machine learning operation component 113 can be implemented by the memory sub-system controller 815 that corresponds to the memory sub-system controller 115. For example, a processor or other circuitry of the memory sub-system controller 815 can implement the operations of the machine learning operation component 113 as described herein. As such, the memory sub-system can include internal logic to perform a machine learning operation. The internal logic can correspond to the memory sub-system controller. For example, the memory sub-system controller can include the functionality to perform a machine learning operation or a neural network processor. Examples of such a machine learning or neural network processor include, but are not limited to, the multiplication and accumulation sub-operations as described herein.

In operation, input data for the machine learning operation can be stored at a memory component 830 and/or memory component 840. In some embodiments, the memory components 830 and 840 are non-volatile memory components, volatile memory components, or a mix of one or more non-volatile memory components and one or more volatile memory components. The machine learning operation component 113 can receive an indication from a host system to perform a machine learning operation. In response to receiving the indication, the machine learning operation component 113 can retrieve input data from one of the memory components 830 and 840. For example, the machine learning operation component 113 can identify particular input data that is stored at one of the memory components and can retrieve the data from the corresponding memory component. Subsequently, the machine learning operation component 113 at the memory sub-system controller 815 can perform the machine learning operation. For example, the multiplication and accumulation sub-operations and any other machine learning sub-operations can be performed by the machine learning operation component 113 that is internal to the memory sub-system controller 815. In some embodiments, the machine learning model for the machine learning operation can be stored at the memory sub-system controller 815 or retrieved from one of the memory components 830 and 840. The internal logic of the memory sub-system controller 815 can be configured based on the machine learning model. Furthermore, the output of the machine learning operation can be returned to the host system that has requested the machine learning operation and/or the output can be stored at one of the memory components 830 and 840. For example, the output can be stored at the same memory component from which the input data was retrieved. In some embodiments, the output can be stored at a particular location of a particular memory component that is used to store output data of the machine learning operation.

Although not shown, in some embodiments, the machine learning operation component 113 can be implemented by another integrated circuit that is separate from the memory sub-system controller 815. For example, another integrated circuit that is coupled with the memory sub-system controller and the memory components 830 and 840 via an internal bus or interface of the memory sub-system controller can perform the functionality of the machine learning operation component 113.

Figure 9:
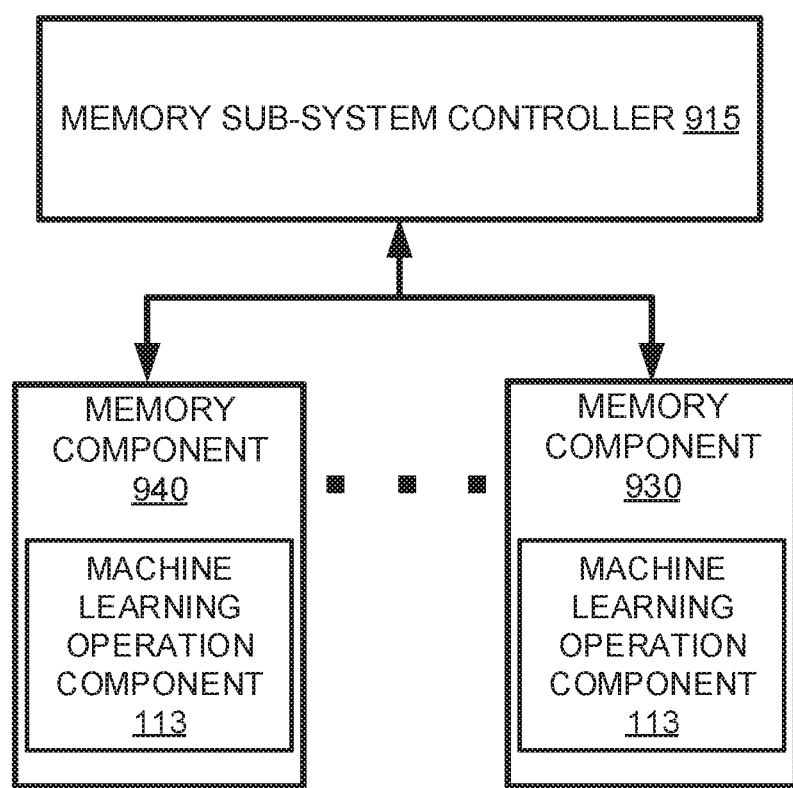
FIG. 9 illustrates a machine learning operation component implemented in one or more memory components of a memory sub-system in accordance with some embodiments of the present disclosure.

FIG. 9 illustrates a machine learning operation component implemented in one or more memory components of a memory sub-system 900 in accordance with some embodiments of the present disclosure.

As shown in FIG. 9, the machine learning operation component 113 can be implemented by one or more memory components 930 and 940. For example, the machine learning operations or neural network accelerator can be performed internally to a memory component. In some embodiments, the memory component can be a volatile memory component and/or a non-volatile memory component. IN the same or alternative embodiments, the internal logic to perform the machine learning operations or neural network accelerator can be performed by any number or combination of volatile memory components and non-volatile memory components.

In operation, the memory sub-system controller 915 can receive a request from a host system to perform a machine learning operation with input data. For example, the host system can specify a particular machine learning model that is to be used with particular input data. The memory sub-system controller 915 can identify the particular memory component that is currently storing the particular input data. Furthermore, the memory sub-system controller 915 can transmit a request to the machine learning operation component 113 at the identified memory component to perform a machine learning operation. For example, the request can specify the input data and the machine learning model that are to be used for the machine learning operation. The machine learning operation component 113 can then configure the internal logic of the memory component to perform the machine learning operation on the input data to generate an output data. The output data can be stored at the memory component and/or provided back to the memory sub-system controller 915 to be returned to the host system.

In some embodiments, the machine learning operation that is performed by the internal logic of the memory component can be certain sub-operations of a machine learning operation. For example, in some embodiments, the internal logic of the memory component can have limited processing capability and can perform a subset of the sub-operations of the machine learning operation. In some embodiments, the internal logic can perform the multiplication and accumulation sub-operations. As previously described, the machine learning operation can correspond to multiple layers of nodes that are associated with the multiplication and accumulation sub-operations. The internal logic of the memory component can perform the sub-operations of a subset of the layers of the machine learning operation to generate intermediate results that are then returned to the memory sub-system controller 915 (or a separate integrated circuit) that can perform further machine learning operations on the intermediate data based on the final layers of the machine learning model to generate the output data. In some embodiments, the intermediate results can be returned to the host system so that the host system can perform further machine learning operations on the intermediate data based on the final layers of the machine learning model to generate the output data.

In some embodiments, different portions of the machine learning operation can be implemented in the internal logic of different memory components. For example, if a machine learning model includes a larger number of nodes or layers, then the internal logic of more memory components can be configured to implement different portions of the machine learning operation as opposed to if the machine learning model includes a smaller number of nodes or layers.

Figure 10:
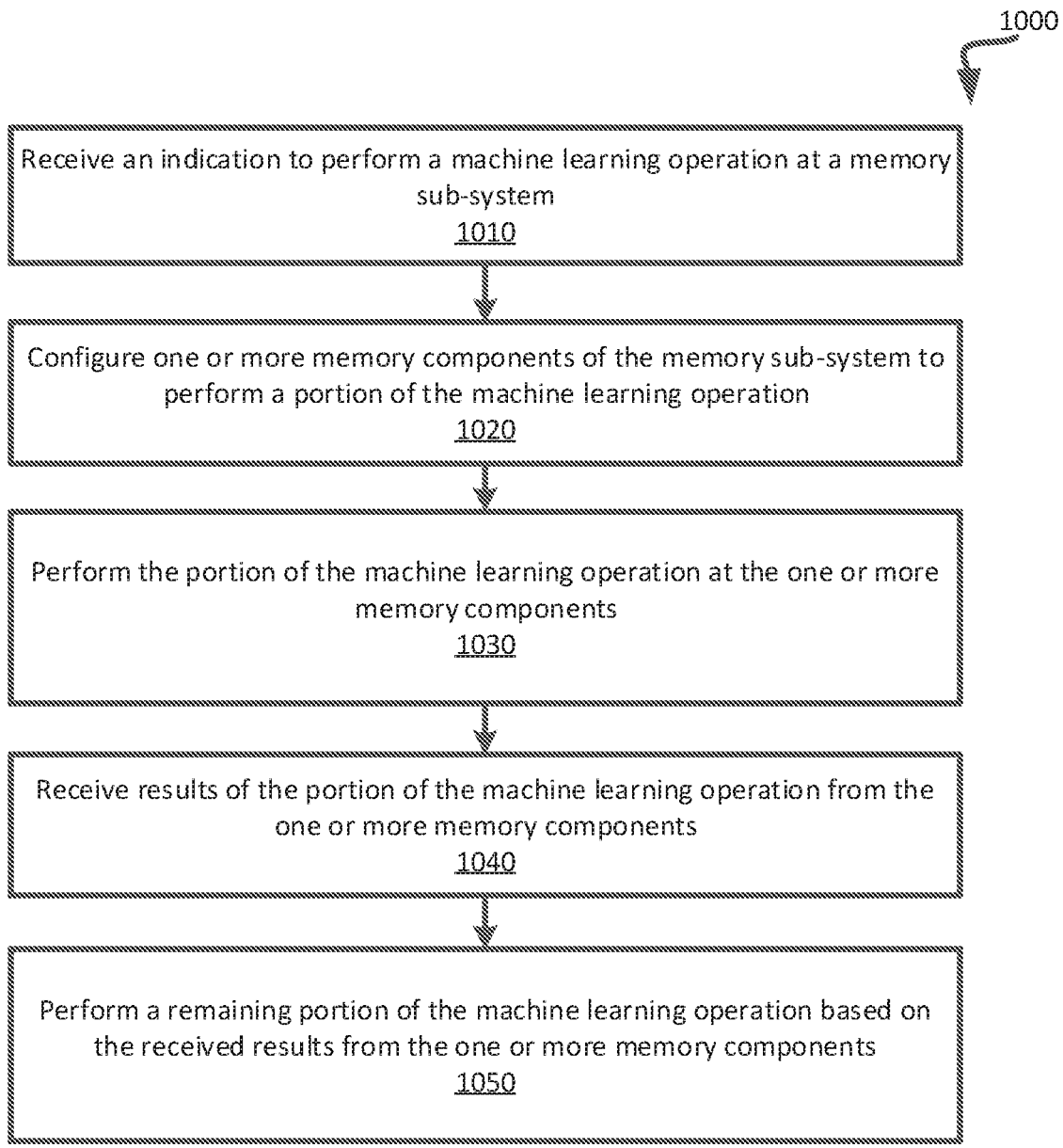
FIG. 10 is a flow diagram of an example method to perform a portion of a machine learning operation at one or more memory components of a memory sub-system in accordance with some embodiments.

FIG. 10 is a flow diagram of an example method to perform a portion of a machine learning operation at one or more memory components of a memory sub-system in accordance with some embodiments. The method 1000 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1000 is performed by the machine learning operation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 10, at operation 1010, the processing logic receives an indication to perform a machine learning operation at a memory sub-system. For example, a host system can provide a request for a neural network accelerator that is internal to the memory sub-system to process input data that is stored at the same memory sub-system. At operation 1020, the processing logic configures one or more memory components of the memory sub-system to perform a portion of the machine learning operation. For example, as previously described, the internal logic of a memory component can perform the sub-operations of the machine learning operation. The memory cells, digital logic, or resistor array of one or more memory components can be configured to perform the multiplication and accumulate sub-operations based on a machine learning model specified by the host system. In some embodiments, the memory component that also stores the input data can be the memory component that is configured to implement the machine learning operation. At operation 1030, the processing logic receives results of the portion of the machine learning operation from the one or more memory components. For example, the results of the sub-operations of the machine learning operation that was performed by the internal logic of one or more memory components can be received. The results can be the output of a multiplication and accumulation sub-operation. In some embodiments, the sub-operations that are performed by the internal logic can be a portion of the layers of the machine learning model corresponding to the machine learning operation. For example, the results of the portion of the machine learning operation can be the intermediate data of a portion of the layers of the machine learning model. The intermediate data can be the input data for the next portion of the layers of the machine learning model that have not been performed by the internal logic of the memory component. At operation 1040, the processing logic performs a remaining portion of the machine learning operation based on the received results from the one or more memory components. For example, the remaining sub-operations of the remaining layers can be performed by the internal logic of a memory sub-system controller or a separate integrated circuit to generate the output data for the machine learning operation. In some embodiments, the intermediate data can be returned to the host system and the host system can perform the remaining portion of the machine learning operation.

As such, the memory components of the memory sub-system can perform a portion of the machine learning operation. The results of the portion of the machine learning operation can be returned to the memory sub-system controller (or host system or separate integrated circuit within the memory sub-system) to complete the machine learning operation with the data returned from the memory components.

Aspects of the present disclosure are further directed to utilizing a bus to transmit data between the host system and a memory component or a memory sub-system. A conventional memory sub-system can include or can be coupled to a bus that is used to transmit data between the host system and the conventional memory sub-system. For example, the bus can be used to transmit requests from the host system (e.g., read operations, write operations, etc.) to the memory sub-system and to transmit data from the memory sub-system to the host system. Another bus can be used to transmit data between the host system and a machine learning processor (e.g., a neural network processor). For example, the host system can transmit data with the machine learning processor over a bus while the host system uses another bus to transmit data with the conventional memory sub-system.

As previously described, a memory component or a memory sub-system can include internal logic that performs the functionality of a machine learning operation. The same memory component or memory sub-system can include functionality to store data for the host system that is separate from the machine learning operation. In some embodiments, the functionality of the machine learning operation that is implemented by the internal logic of the memory component or memory sub-system can be referred to as a machine learning space while the memory cells of the memory component or memory sub-system that are used to store host data separate from the machine learning operation can be referred to as a memory space. As such, a single memory component or memory sub-system can include functionality for both the machine learning space and the memory space. As a result, a single bus cannot be used to transmit data for only the memory space of the memory component or memory sub-system.

Aspects of the present disclosure address the above and other deficiencies by transmitting data for the machine learning space and memory space of a memory component or memory sub-system over a single bus or by transmitting data for the machine learning space and memory space of the memory component or memory sub-system over multiple buses. For example, a single bus can be virtualized to transmit data between the host system and the memory component or memory sub-system. In some embodiments, the host system can transmit an operation (e.g., a read request, write request, etc.) over the bus to the memory component or memory sub-system. Based on the type of operation or a memory address location of the operation, the operation from the host system can be transmitted to be performed at the machine learning space or the memory space of the memory component or memory sub-system. As such, the operations from the host system that are transmitted over a single bus can be provided to the memory space or the machine learning space.

In some embodiments, multiple buses can be used to transmit data between the memory component or the memory sub-system that includes the memory space and machine learning space. For example, a bus can be used to transmit data between the host system and the memory space and another bus can be used to transmit data between the host system and the machine learning space. As such, the memory component or memory sub-system can include multiple buses that are each used to separately transmit data between the memory space and the machine learning space.

Advantages of the present disclosure include, but are not limited to, a decrease in the complexity of a design of the memory component or the memory sub-system when a single bus is used to transmit data for a machine learning space and a memory space within the memory component or memory sub-system. For example, the single bus can result in fewer connections and less routing than multiple buses that are to couple the host system with the memory component or memory sub-system. Additionally, the management of data or operations transmitted over the bus for the memory space and the machine learning space can result in improved performance for the memory space and the machine learning space. The use of separate buses for the memory space and the machine learning space can result in the faster transmission of data for each of the memory space and the machine learning space, resulting in improved performance for the functionality of the memory space and the machine learning space.

Figure 11:
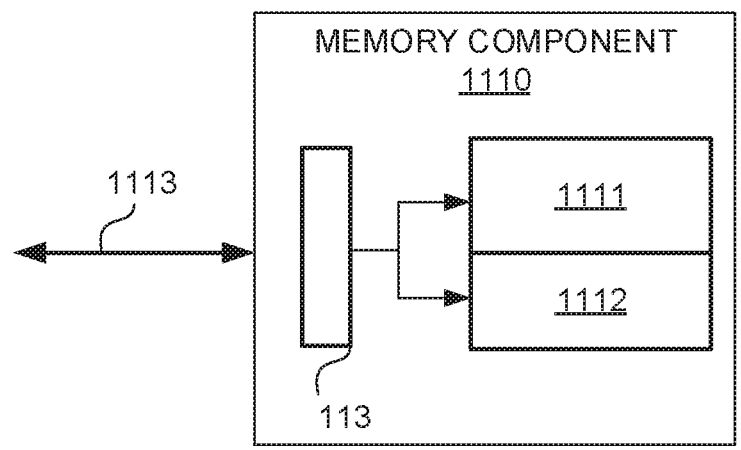
FIG. 11 illustrates an example memory component and memory sub-system with a single bus being used to transmit data for a memory space and a machine learning space in accordance with some embodiments of the present disclosure.
Figure 11:
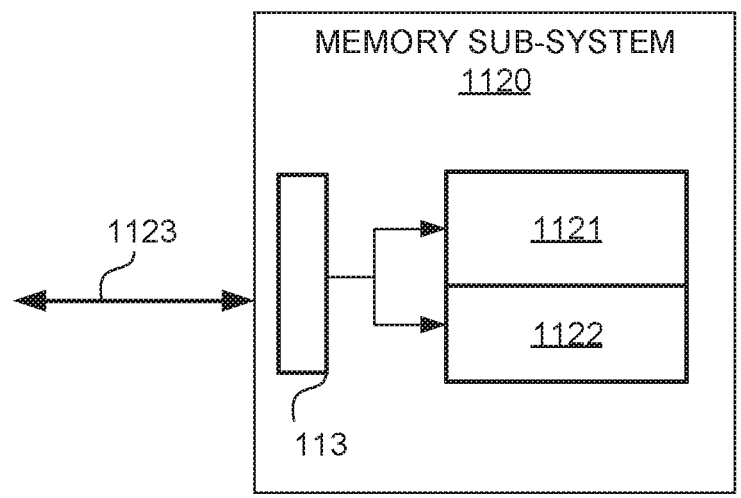

FIG. 11 illustrates an example memory component 1110 and memory sub-system 1120 with a single bus being used to transmit data for a memory space and a machine learning space in accordance with some embodiments of the present disclosure. The machine learning operation component 113 can be used to transmit and receive data for the memory space and the machine learning space for each of the memory component 1110 and memory sub-system 1120.

As shown in FIG. 11, the memory component 1110 can include the machine learning operation component 113 to manage the receiving and transmitting of data over a single bus 1113 for a memory space 1111 and a machine learning space 1112 of the memory component 1110. As previously described, the memory space 1111 can be memory cells or any other storage unit of the memory component 1110 that can be used to store host data from a host system. In some embodiments, the host data can be data that is not to be used by a machine learning operation of the machine learning space 1112. The machine learning space 1112 can be internal logic of the memory component 1110. For example, as previously described, the internal logic can correspond to other memory cells (or any other type of storage unit) of the memory component 1110 that are to be configured or programmed based on a definition of a machine learning model so that the machine learning operation can be performed at the memory cells.

Furthermore, the memory sub-system 1120 can include the machine learning operation component 113 to manage the receiving and transmitting of data over a single bus 1123 for a memory space 1121 and a machine learning space 1122. For example, the memory space 1121 can be memory cells of one or more memory components that are used to store host data as previously described and the machine learning space 1122 can be internal logic of one or more memory components that are used to perform one or more machine learning operations. In some embodiments, the internal logic of the machine learning space 1122 can be included in a controller of the memory sub-system 1120 as previously described. In some embodiments, the memory component 1110 and the memory sub-system 1120 can include a decoder that can be used to receive data from the respective bus and to decode the received data before transmitting the decoded data to the memory space and/or the machine learning space. For example, the decoder can decode a logical address specified by an operation provided via a bus to a physical address that is located at one of the memory space or the machine learning space. In some embodiments, each of the memory space and the machine learning space can include a separate decoder.

Furthermore, an internal bus can be used to couple the machine learning space with the memory space. For example, input data and the machine learning machine learning model can be transmitted from the memory space to the machine learning space via the internal bus while the output data from the machine learning space can be transmitted to the memory space via the internal bus. As such, the memory component or memory sub-system can include a bus that is used to transmit data between the host system and the memory component or memory sub-system as well as an internal bus that is used to transmit data between the memory space and the machine learning space of the memory component or memory sub-system.

In operation, data can be transmitted between a host system and the memory component or the memory sub-system over the single bus. In some embodiments, a bus can refer to an interface of one or more signals that are used to transmit data between at least two devices (e.g., the host system and the memory component or memory sub-system). The memory component or memory sub-system can receive requests for operations via the single bus for the memory space and the machine learning space. Examples of operations for the memory space include, but are not limited to, read operations, write operations, and erase operations associated with host data. Examples of operations for the machine learning space include, but are not limited to, the providing of input data for a machine learning operation, the providing of a definition of a machine learning model, a command to initiate or execute a machine learning operation based on a particular definition of a machine learning model with particular input data, a request to receive output data or results of a machine learning operation, etc. In some embodiments, an operation or the machine learning space can be any operation that interacts with a machine learning operation. As such, different operations for different functionality (e.g., the memory space or the machine learning space) that are internal to the memory component or the memory sub-system can be received over the same virtualized bus. As described in further detail below, the operations or data can be transmitted or provided to the memory space or the machine learning space based on a type of operation that is received or another characteristic or attribute of the operation or data.

Figure 12:
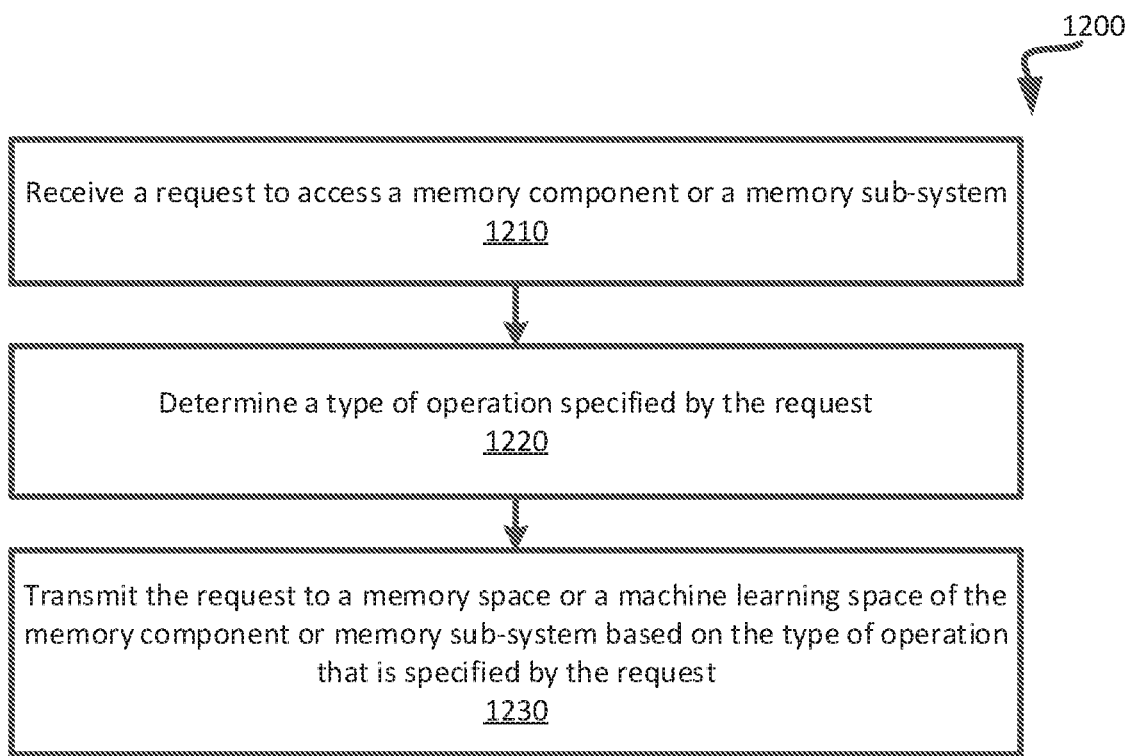
FIG. 12 is a flow diagram of an example method to transmit a requested operation to a memory space or a machine learning space based on a type of operation in accordance with some embodiments.

FIG. 12 is a flow diagram of an example method 1200 to transmit a requested operation to a memory space or a machine learning space based on a type of operation in accordance with some embodiments. The method 1200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1200 is performed by the machine learning operation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 12, at operation 1210, the processing logic receives a request to access a memory component or a memory sub-system. The request can be provided by a host system. For example, the request can be an operation that is to access the memory space or the machine learning space of the memory component or memory sub-system. The request can be received via a bus or other such interface that is used to transmit data between a host system and the memory component and/or memory sub-system. At operation 1220, the processing logic determines a type of operation specified by the request. For example, the request can specify an operation that is to be performed at a memory space or a machine learning space of the memory component or memory sub-system. For example, the request can be an operation to write data to or to read data from the memory component or the memory sub-system. The request can specify any operation that can be used to access or modify host data stored at the memory space of the memory component or the memory sub-system. Additionally, the request can be an operation to access, update, or interact with input data, output data, or a machine learning definition and/or to execute or perform a machine learning operation at the internal logic of the memory component or memory sub-system. As such, the operation can be a first type of operation that corresponds to an operation for the memory space or a second type of operation that corresponds to an operation for the machine learning space. The operation can specify a type of action that is to be performed at the memory component or memory sub-system.

At operation 1230, the processing logic transmits the request to a memory space or a machine learning space of the memory component or memory sub-system based on the type of operation that is specified by the request. For example, the operation provided by the host system can be provided to either the machine learning space or the memory space based on whether the operation is typically used to access the memory space or the machine learning space. For example, the memory component or the memory sub-system can include a data structure that identifies the different types of operations that can be performed by the memory component or memory sub-system and that can be received from the host system. Each type of operation can be assigned to either the memory space or the machine learning space. When a request for an operation that is assigned to the memory space is received via the bus, then the operation can be transmitted to or performed at the memory space. In some embodiments, the operation can be transmitted to a decoder or another component that is used to decode operations for the memory space. Otherwise, when the request for an operation that is assigned to the machine learning space is received via the bus, then the operation can be transmitted to or performed at the machine learning space. In some embodiments, the operation can be transmitted to a decoder or another component that is used to decode operations for the machine learning space.

As such, different types of operations can be transmitted to a memory component or a memory sub-system via a single bus. The operations can be transmitted to a memory space or a machine learning space based on the type of the operation.

Figure 13:
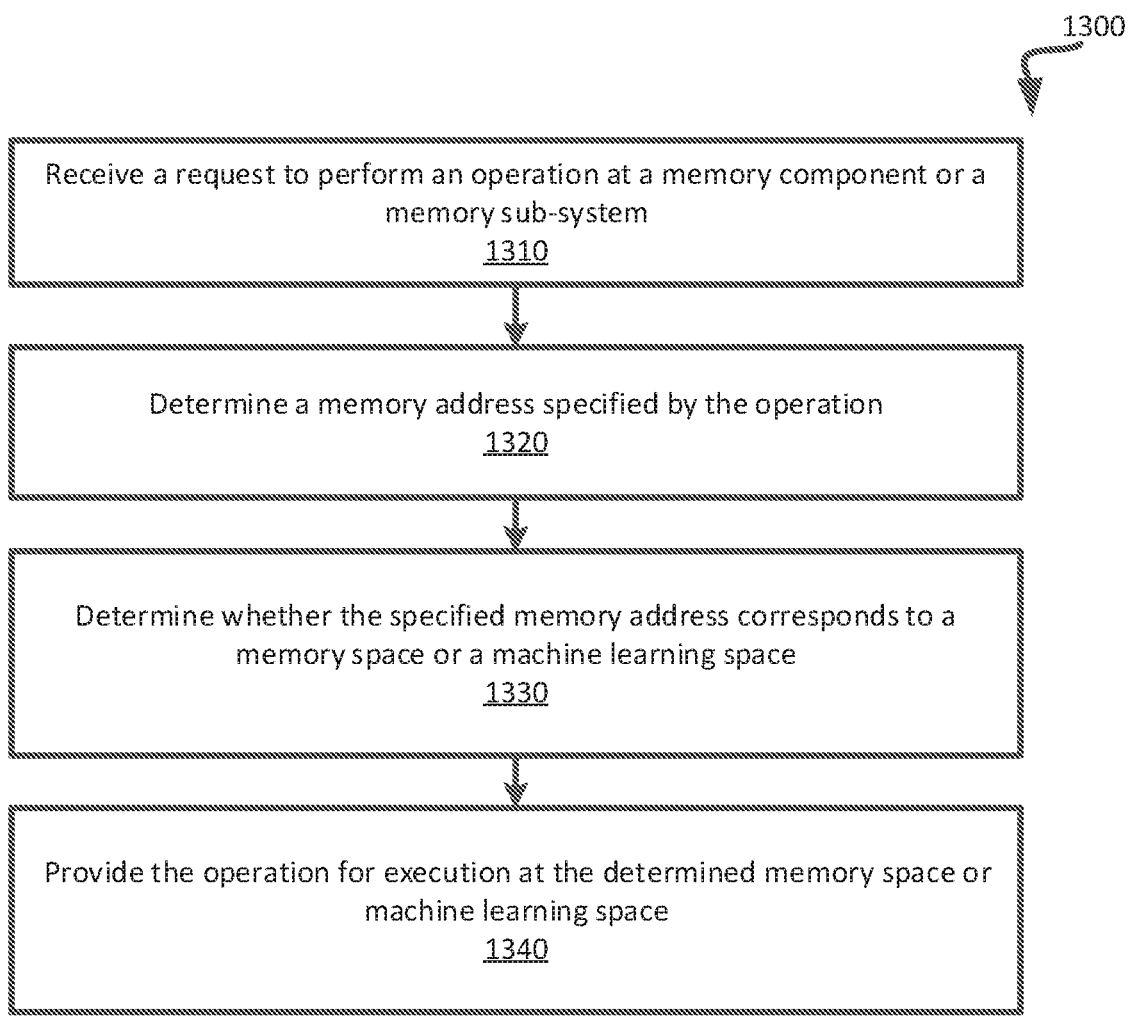
FIG. 13 is a flow diagram of an example method to provide a requested operation to a memory space or a machine learning space based on a memory address in accordance with some embodiments.

FIG. 13 is a flow diagram of an example method 1300 to provide a requested operation to a memory space or a machine learning space based on a memory address in accordance with some embodiments. The method 1300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1300 is performed by the machine learning operation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 13, at operation 1310, the processing logic receives a request to perform an operation at a memory component or a memory sub-system. As previously described, the operation can be an operation for the memory space (e.g., a read operation, write operations, erase operation, etc.) or an operation for the machine learning space (e.g., an operation associated with the machine learning operation). At operation 1320, the processing logic determines a memory address specified by the operation. For example, the operation can specify a memory address or other such location of a data block or other such logical or physical data unit of the memory component or the memory sub-system. In some embodiments, the memory address can be a location of a physical data block of the memory component or a memory component in the memory sub-system.

At operation 1330, the processing logic determines whether the memory address corresponds to a memory space or a machine learning space. For example, a range of memory addresses can be assigned to the memory space and another range of memory address can be assigned to the machine learning space. Each range of memory addresses can include a unique set of memory addresses such that a memory address is assigned to only one of the memory space or the machine learning space. At operation 1340, the processing logic provides the operation for execution at the determined memory space or the machine learning space. For example, the operation can be forwarded to a decoder or other such component of the memory component or memory sub-system that is used to decode operations for the respective memory space or the respective machine learning space. The operation can be provided to the memory space if the memory address of the operation is included in the range of memory addresses assigned to the memory space. Otherwise, the operation can be provided to the machine learning space if the memory address of the operation is included in the range of memory addresses assigned to the machine learning space.

Figure 14:
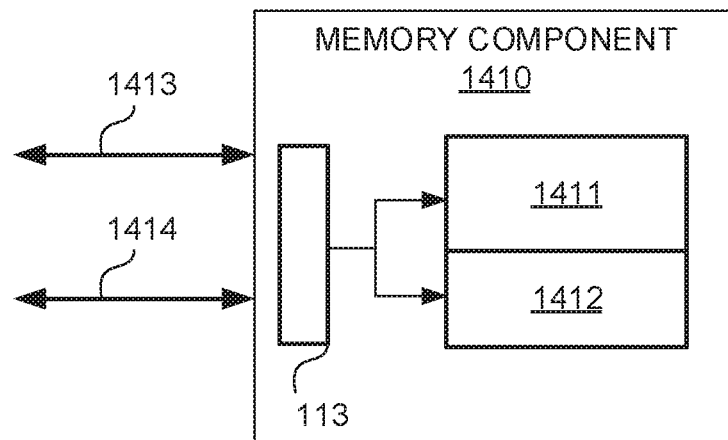
FIG. 14 illustrates an example memory component and memory sub-system with separate buses being used to transmit data for a memory space and a machine learning space in accordance with some embodiments of the present disclosure.
Figure 14:
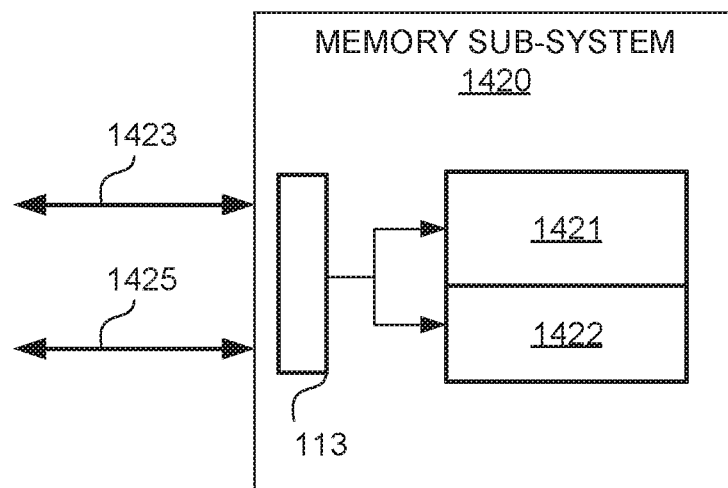

FIG. 14 illustrates an example memory component 1410 and memory sub-system 1420 with separate buses being used to transmit data for a memory space and a machine learning space in accordance with some embodiments of the present disclosure. Each of the memory component 1410 and the memory sub-system 1420 can include the machine learning operation component 113 to transmit and receive data for the memory space and the machine learning space over separate buses.

As shown in FIG. 14, the memory component 1410 can include the machine learning operation component 113, a memory space 1411, and a machine learning space 1412. The memory component 1410 can be coupled to buses or interfaces 1413 and 1414. Each bus 1413 and 1414 can be used to transmit data for a respective memory space 1411 and machine learning space 1412. For example, the bus 1413 can be used to transmit data between a host system and the memory space 1411 and the bus 1414 can be used to transmit data between the host system and the machine learning space 1412. As such, each bus can be used to transmit data between the host system and one of the memory space 1411 and machine learning space 1412 while not transmitting data for the other of the memory space 1411 and the machine learning space 1412. Similarly, the memory sub-system 1412 can include the machine learning operation component 113 that can forward or provide data received via the buses 1423 and 1425 to the memory space 1421 or the machine learning space 1422. For example, the bus 1423 can be used to transmit data between the host system and the memory space 1421 and the bus 1425 can be used to transmit data between the host system and the machine learning space 1422.

Furthermore, an internal bus can be used to couple the machine learning space with the memory space of the memory component 1410 or the memory sub-system 1420. As such, the memory component or memory sub-system can include separate buses that are used to transmit data between the host system and the machine learning space and memory space of the memory component or memory sub-system as well as an internal bus that is used to transmit data between the memory space and the machine learning space of the memory component or memory sub-system.

In operation, data can be transmitted between a host system and the memory component or the memory sub-system over two buses where each bus is dedicated to one of the memory space or machine learning space that are internal to the memory component or memory sub-system. For example, data received via the bus 1423 can be forwarded or provided to the memory space 1421 while data received via the bus 1425 can be forwarded or provided to the machine learning space 1422.

Figure 15:
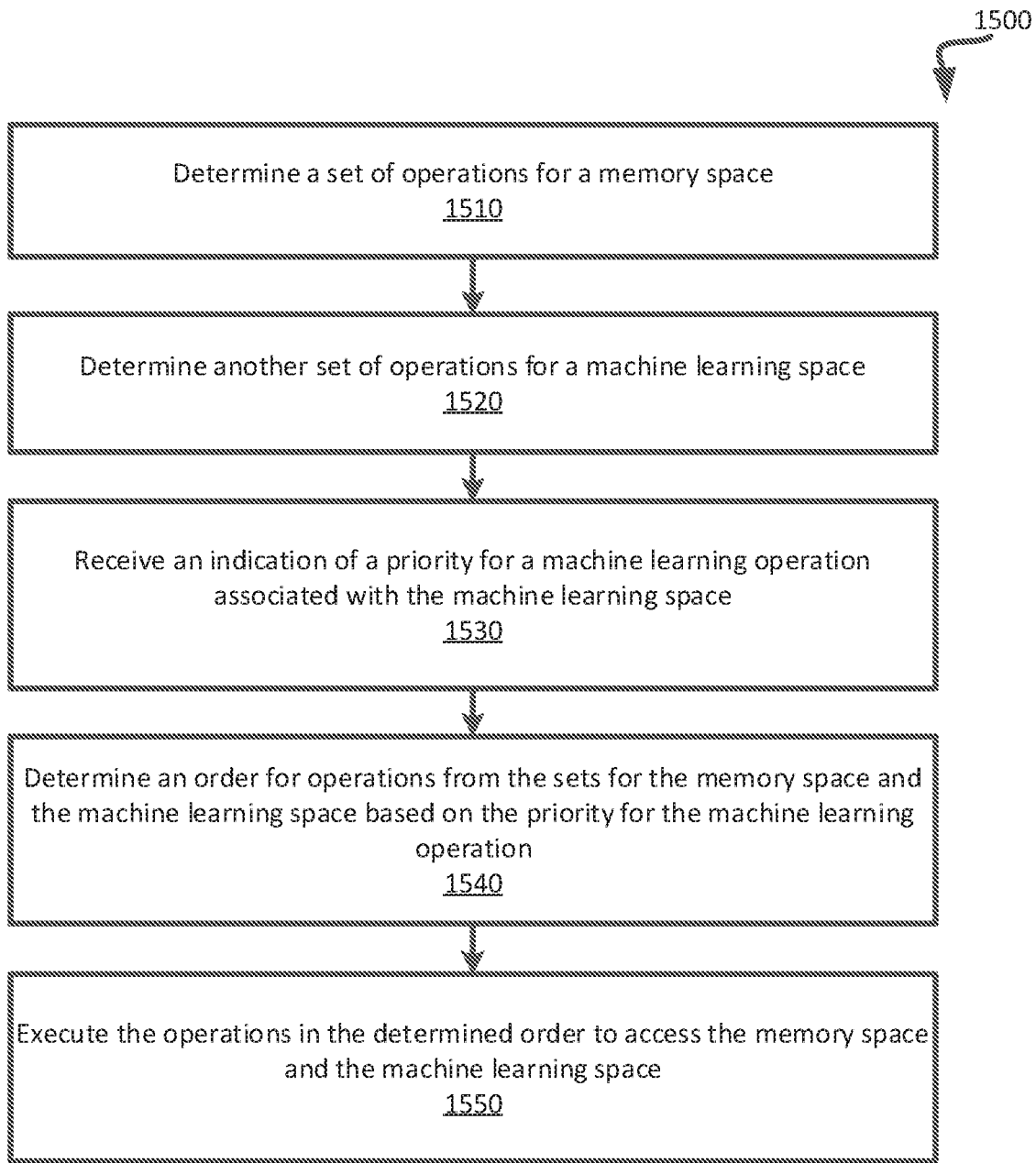
FIG. 15 is a flow diagram of an example method to execute operations in an order based on a priority for a machine learning operation in accordance with some embodiments of the present disclosure.

FIG. 15 is a flow diagram of an example method to execute operations in an order based on a priority for a machine learning operation in accordance with some embodiments of the present disclosure. The method 1500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1500 is performed by the machine learning operation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 15, at operation 1510, the processing logic determines a set of operations for a memory space. The set of operations can be operations that have been received by a memory component or a memory sub-system. In some embodiments, the set of operations can be stored at a buffer memory of the memory component or memory sub-system. For example, the set of operations can be operations that have been provided by a host system and that are to be executed at the memory component or the memory sub-system. The set of operations can be received via a virtualized bus or a separate bus as previously described. Furthermore, the set of operations can include, but are not limited to, a read operation of host data, a write operation of host data, or an erase operation of host data stored at the memory component or the memory sub-system and that is separate from or not to be used by a machine learning operation. Each of the operations can be operations that are to be performed at the memory space of the memory component or memory sub-system. In some embodiments, a memory sub-system controller of the memory sub-system or the local controller of the memory component can receive the set of operations. In the same or alternative embodiments, the set of operations can be stored at a buffer of the memory sub-system or the memory component.

At operation 1520, the processing logic determines another set of operations for a machine learning space. For example, the other set of operations can be received from the host system that are to be performed for a machine learning operation as previously described. The other set of operations can be received via a virtualized bus or another bus that is separate from the bus that provides the set of operations for the memory space. As such, operations for the memory space and the machine learning space can be received by the memory component or memory sub-system. At operation 1530, the processing logic receives an indication of a priority for a machine learning operation associated with the machine learning space. The priority can be received from the host system. For example, the host system can transmit a message that indicates a priority level for the machine learning operation that is being performed at the machine learning space or is to be performed at the machine learning space. In some embodiments, the priority can be a numerical or other such value that specifies an importance or a performance requirement for the machine learning operation. For example, the priority can have a high value to indicate a high priority level or a low value to indicate a low priority level for the machine learning operation. The performance requirement can specify a maximum amount of time that the machine learning operation is to execute to process input data, a rate at which input data is to be processed by the machine learning operation, an amount of time that can elapse before output data of the machine learning operation is to be provided to the host system, etc. In some embodiments, the priority for the machine learning operation can be based on the input data that is provided to the machine learning operation. For example, if the input data has a high priority level, then the machine learning operation can also have a high priority level when applying a machine learning model to the input data. Otherwise, if the input data does not have a high priority level, then the machine learning operation does not have a high priority level when applying the machine learning model to the input data.

At operation 1540, the processing logic determines an order for operations from the sets for the memory space and the machine learning space based on the priority for the machine learning operation. For example, the operations from the set for the memory space and the other set for the machine learning space can be initially ordered as the different operations are received at the memory component or memory sub-system. As such, the operations can be an initial order based on when each respective operation has been received at the memory component or memory sub-system. For example, an operation that is received before another operation can specified in an order before the other operation. The order can then be changed based on the priority for the machine learning operation. For example, if the host system indicates that the machine learning operation has a high priority or other such designation, then the operations for the machine learning space can be reordered to be before the operations for the memory space.

At operation 1550, the processing logic executes the operations in the determined order to access the memory space and the machine learning space. For example, the operations can be executed or transmitted to the memory space and the machine learning space based on the reordering of the operations so that an earlier specified operation is performed or transmitted before a later specified operation.

As such, the order of operations for the memory space and the machine learning space can change based on a priority of a machine learning operation that is to be performed at the machine learning space. If the priority of the machine learning operation is high, then one or more operations for the machine learning operation can be placed earlier in the order than other operations for the memory space. For example, the operations for the machine learning operation can be executed earlier as the machine learning operation is associated with a higher priority or importance. Otherwise, if the priority of the machine learning operation is low, then the operations for the memory space and the operations for the memory space can be ordered as the respective operations are received at the memory component or memory sub-system.

Figure 16A:
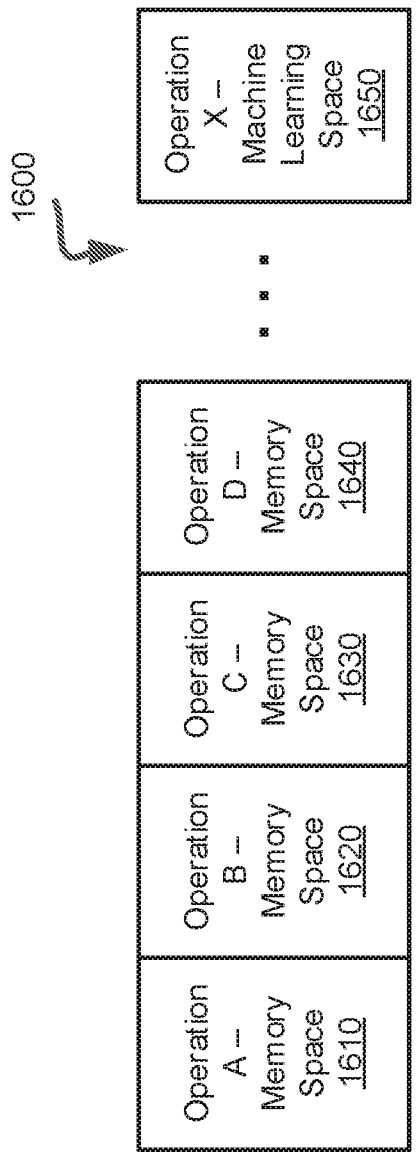
FIG. 16A illustrates a series of operations that have been received for a memory space and a machine learning space of a memory component or memory sub-system in accordance with some embodiments of the present disclosure.

FIG. 16A illustrates a series of operations that have been received for a memory space and a machine learning space of a memory component or memory sub-system in accordance with some embodiments of the present disclosure. In some embodiments, the machine learning operation component 113 of a memory component or memory sub-system can receive the series of operations for the memory space and the machine learning space. The series of operations can be ordered in a sequence as each operation is received by the memory component or memory sub-system.

As shown in FIG. 16A, operations 1600 can be initially ordered as the operations are received from a host system. For example, operation A 1610 can be initially received from the host system followed by operation B 1620, operation C 1630, operation D 1640, and operation X 1650. The operations A to D can specify the memory space while the operation X 1650 can specify the machine learning space. In some embodiments, the host system can provide an indication of whether a respective operation is to be performed at the memory space or the machine learning space. In the same or alternative embodiments, the type of operation or the memory address of an operation can be used to determine whether the operation is to be performed at the memory space or the machine learning space, as previously described.

Figure 16B:
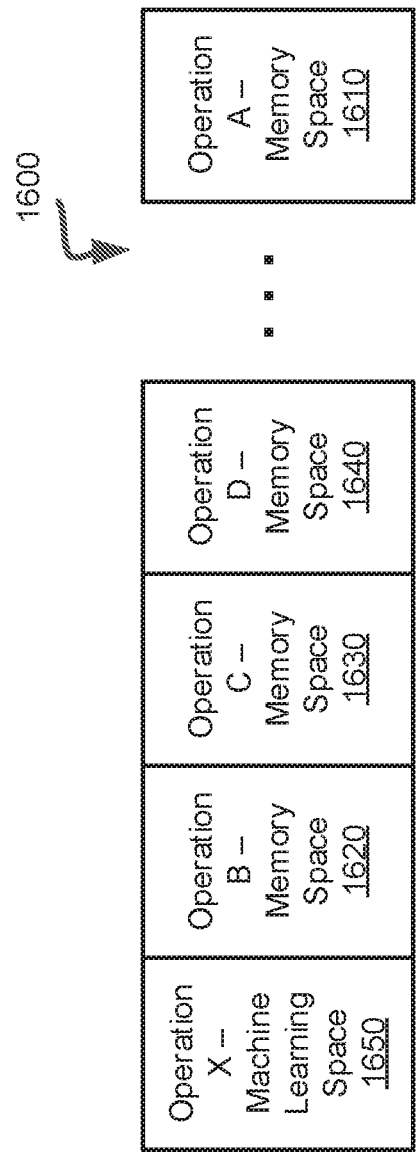
FIG. 16B illustrates the series of operations that have been ordered based on a priority for a machine learning operation in accordance with some embodiments of the present disclosure.

FIG. 16B illustrates the series of operations that have been ordered based on a priority for a machine learning operation in accordance with some embodiments of the present disclosure. In some embodiments, the machine learning operation component 113 of a memory component or memory sub-system can order the series of operations for the memory space and the machine learning space based on the priority for the machine learning operation.

As shown in FIG. 16B, operations 1600 can be reordered based on the priority of the machine learning operation. For example, the host system can indicate that the priority for the machine learning operation is high or is higher than a priority for the operations for the memory space. As such, the operation X 1650 that was received later can be reordered so that the operation X 1650 can be performed before the other operations A through D and/or can be transmitted to the machine learning space before the other operations A through D are transmitted to the memory space.

Figure 17:
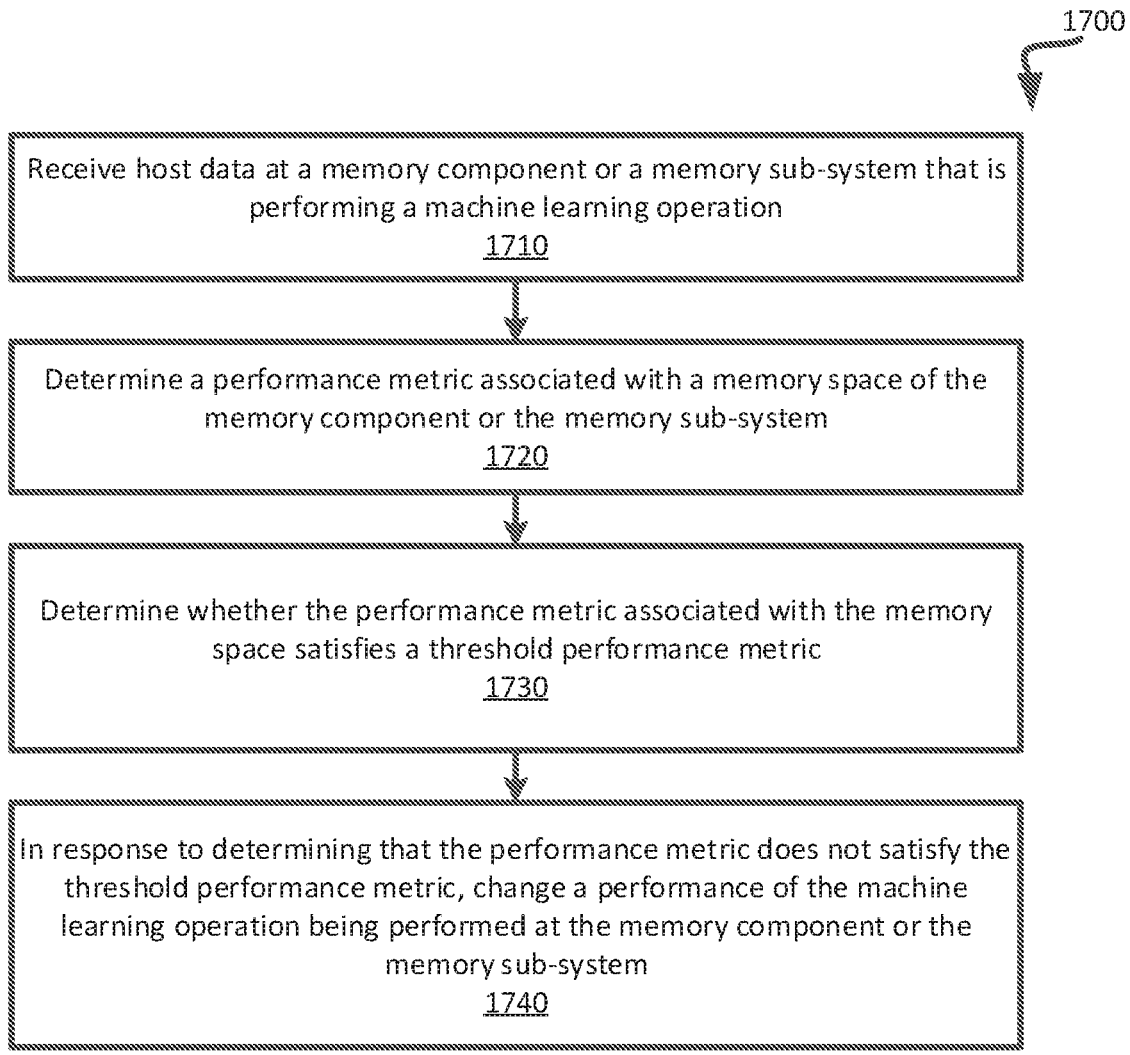
FIG. 17 is a flow diagram of an example method to change a performance of a machine learning operation based on a performance metric associated with a memory space in accordance with some embodiments

FIG. 17 is a flow diagram of an example method to change a performance of a machine learning operation based on a performance metric associated with a memory space in accordance with some embodiments. The method 1700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1700 is performed by the machine learning operation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 17, at operation 1710, the processing logic receives host data at a memory component or a memory sub-system that is performing a machine learning operation. For example, a host system can provide read operations, write operations, or erase operations that are to be performed at the memory component or memory sub-system while internal logic of the memory component or memory sub-system is performing a machine learning operation. At operation 1720, the processing logic determines a performance metric associated with a memory space of the memory component or the memory sub-system. The performance metric can be based on a rate of performance of the read, write, or erase operations at the memory space while the internal logic of the machine learning space is performing the machine learning operation. For example, in some embodiments, the internal logic of the machine learning space can impact the performance of the memory space. In some embodiments, the type of machine learning model, amount of input data, etc. using for the machine learning operation at the machine learning space can change the rate at which operations are performed at the memory space. As a larger machine learning machine learning model or more operations are performed for the machine learning space, less resources of the memory component or memory subsystem can be used for the memory space. At operation 1730, the processing logic determines whether the performance metric associated with the memory space has satisfied a threshold performance metric. For example, the performance metric can be considered to satisfy the threshold performance metric when the performance metric is equal to or is less than the threshold performance metric. The performance metric can be considered to not satisfy the threshold performance metric when the performance metric is more than the threshold performance metric. As previously described, the performance metric can correspond to a rate of performance of operations for the memory space. For example, the performance metric can be a latency of write operations, read operations, or a combination of write operations and read operations that are performed for the memory space. The performance metric can be determined to not satisfy the performance metric threshold when the latency of the operations exceeds a threshold latency while the performance metric can be determined to satisfy the performance metric threshold when the latency of the operations is equal to or less than the threshold latency.

At operation 1740, the processing logic changes a performance of the machine learning operation being performed at the memory component or the memory subsystem in response to determining that the performance metric does not satisfy the threshold performance metric. For example, if the latency of the operations exceeds a threshold latency metric, then the machine learning operation can be changed so that the latency of the operations for the memory space can be below the threshold latency metric. In some embodiments, the performance of the machine learning operation can be changed by reducing the rate of performance of the machine learning operations, reducing the rate at which the input data can be provided to the machine learning operation, a utilizing a different machine learning model such as a machine learning model that utilizes less sub-operations, etc. Otherwise, if the performance of the machine learning operation being performed at the memory component or the memory sub-system in response to determining that the performance metric satisfies the threshold performance metric, then the machine learning operation is not changed.

Figure 18:
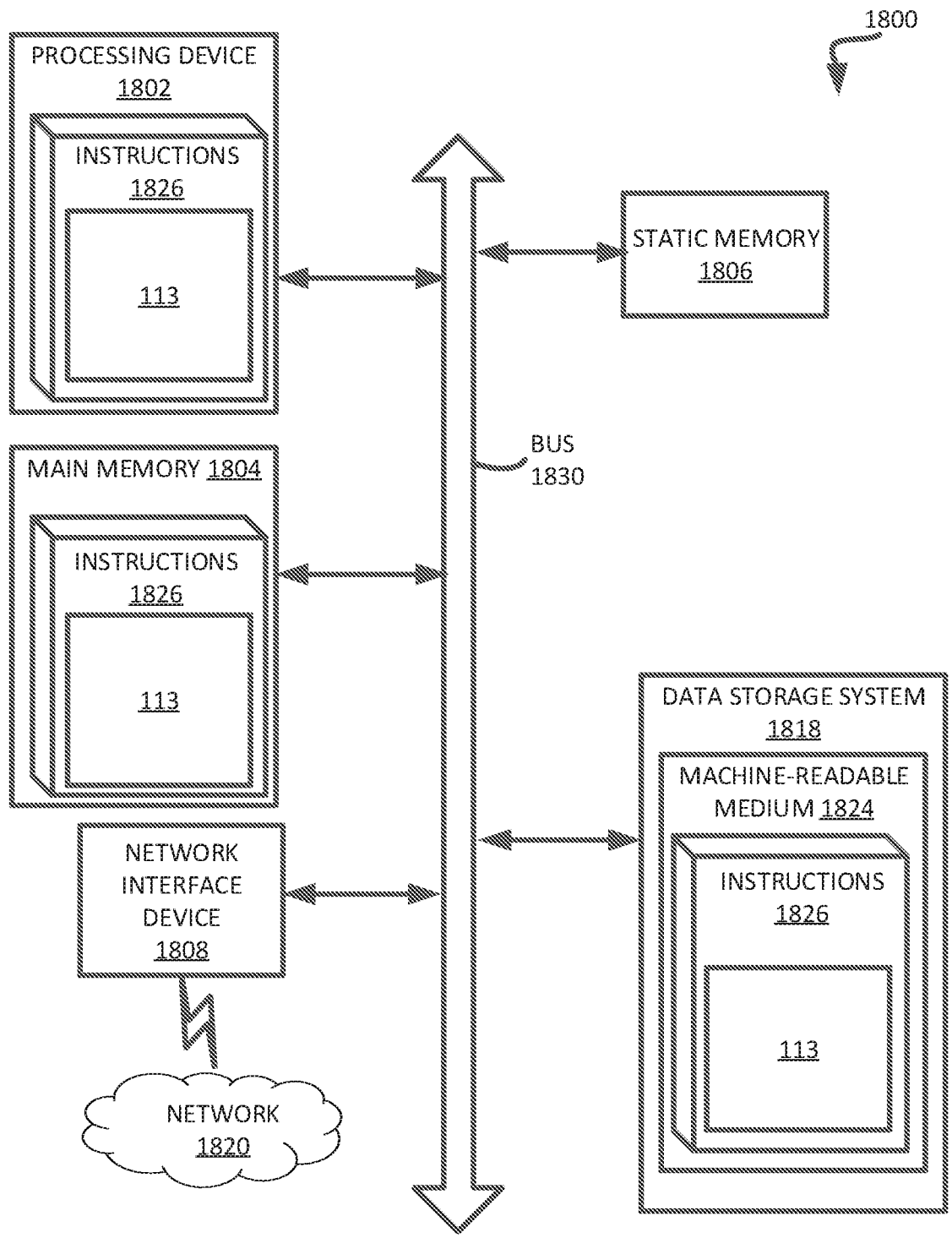
FIG. 18 is a block diagram of an example computer system in which implementations of the present disclosure can operate.

FIG. 18 illustrates an example machine of a computer system 1800 within which a set of instructions, for causing the machine to perform any one or more of the methodologies discussed herein, can be executed. In some embodiments, the computer system 1800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to a machine learning operation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1800 includes a processing device 1802, a main memory 1804 (e.g., read-only memory (ROM), flash memory, dynamic random access memory (DRAM) such as synchronous DRAM (SDRAM) or Rambus DRAM (RDRAM), etc.), a static memory 1806 (e.g., flash memory, static random access memory (SRAM), etc.), and a data storage system 1818, which communicate with each other via a bus 1830.

Processing device 1802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1802 can also be one or more special-purpose processing devices such as an application specific integrated circuit (ASIC), a field programmable gate array (FPGA), a digital signal processor (DSP), network processor, or the like. The processing device 1802 is configured to execute instructions 1826 for performing the operations and steps discussed herein. The computer system 1800 can further include a network interface device 1808 to communicate over the network 1820.

The data storage system 1818 can include a machine-readable storage medium 1824 (also known as a computer-readable medium) on which is stored one or more sets of instructions 1826 or software embodying any one or more of the methodologies or functions described herein. The instructions 1826 can also reside, completely or at least partially, within the main memory 1804 and/or within the processing device 1802 during execution thereof by the computer system 1800, the main memory 1804 and the processing device 1802 also constituting machine-readable storage media. The machine-readable storage medium 1824, data storage system 1818, and/or main memory 1804 can correspond to the memory sub-system 110 of FIG. 1.

In one embodiment, the instructions 1826 include instructions to implement functionality corresponding to a machine learning operation component (e.g., the machine learning operation component 113 of FIG. 1). While the machine-readable storage medium 1824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a memory component to store host data from a host system in a first memory region and to store a machine learning model and input data in a second memory region, wherein the input data is separate from the host data;
    a controller comprising an in-memory logic to perform a machine learning operation by applying the machine learning model to the input data to generate an output data;
    a bus to receive additional host data from the host system and to provide the additional host data to the memory component; and
    an additional bus to receive machine learning data from the host system and to provide the machine learning data to the in-memory logic that is to perform the machine learning operation.

2. The system of claim 1, further comprising:
    an internal bus coupled to the memory component and the in-memory logic, wherein the machine learning model and the input data are transmitted from the memory component to the in-memory logic via the internal bus, and wherein the output data of the machine learning operation is transmitted from the in-memory logic to the memory component via the internal bus.

3. The system of claim 1, further comprising:
    a first decoder associated with the memory component to decode an operation associated with the additional host data to determine a memory address of the memory component that is associated with the additional host data; and
    a second decoder associated with the in-memory logic to decode another operation associated with the machine learning data to determine another memory address of the memory region that is associated with the machine learning data.

4. The system of claim 1, wherein the additional host data corresponds to operations for the memory component, and wherein the machine learning data corresponds to operations for the in-memory logic, wherein the controller is further to:
    determine an order for the operations for the memory component and the operations for the in-memory logic based on a priority of the machine learning operation; and
    perform the operations for the memory component and the operations for the in-memory logic based on the determined order.

5. The system of claim 4, wherein a later received operation for the in-memory logic is ordered before an earlier received operation for the memory component based on the priority of the machine learning operation.

6. The system of claim 1, wherein the bus and the additional bus each correspond to an external bus that couples the system to the host system.

7. The system of claim 1, wherein the machine learning model is a neural network model.

8. A method comprising:
receiving host data at a first bus of a memory sub-system that is performing a machine learning operation;
receiving additional data associated with the machine learning operation at a second bus of the memory sub-system, wherein the host data is separate from the additional data;
determining, based on the host data, a performance metric associated with a memory space of the memory sub-system;
determining, by a processing device, whether the performance metric associated with the memory space satisfies a threshold performance metric; and
in response to determining that the performance metric does not satisfy the threshold performance metric, changing a performance of the machine learning operation being performed at the memory sub-system.

9. The method of claim 8, wherein the performance metric is associated with a latency for read operations or write operations that are performed at the memory space.

10. The method of claim 8, wherein the changing of the performance of the machine learning operation comprises:
reducing a rate of performance of the machine learning operation.

11. The method of claim 8,
wherein the performance of the machine learning operation is associated with the additional data.

12. The method of claim 8, wherein the machine learning operation is associated with a neural network machine learning model.

13. The method of claim 8, wherein changing a performance of the machine learning operation being performed at the memory sub-system comprises:
reducing a rate at which input data is provided to the machine learning operation.

14. The method of claim 8, wherein changing a performance of the machine learning operation being performed at the memory sub-system comprises:
changing a machine learning model that is to be used by the machine learning operation.

15. A system comprising:
a memory component; and
a processing device, operatively coupled with the memory component, to:
receive host data at a first bus of the system;
receive additional data at a second bus of the system, wherein the additional data is associated with a machine learning operation, and wherein the host data is separate from the additional data;
determine a performance metric associated with a memory space of the system based on the host data;
determine whether the performance metric associated with the memory space satisfies a threshold performance metric; and
in response to determining that the performance metric does not satisfy the threshold performance metric, change a performance of the machine learning operation being performed at the system.

16. The system of claim 15, wherein the performance metric is associated with a latency for read operations or write operations that are performed at the memory space.

17. The system of claim 15, wherein to change the performance of the machine learning operation, the processing device is further to:
reduce a rate of performance of the machine learning operation.

18. The system of claim 15,
wherein the performance of the machine learning operation is associated with the additional data.

19. The system of claim 15, wherein the machine learning operation is associated with a neural network machine learning model.

20. The system of claim 15, wherein to change a performance of the machine learning operation, the processing device is further to:
reduce a rate at which input data is provided to the machine learning operation.

* * * * *